(12) United States Patent
Ye et al.

(10) Patent No.: US 12,238,685 B2
(45) Date of Patent: Feb. 25, 2025

(54) SYSTEMS AND METHODS FOR ENHANCEMENT ON SIDELINK POWER CONTROL

(71) Applicant: APPLE INC., Cupertino, CA (US)

(72) Inventors: Chunxuan Ye, San Diego, CA (US); Dawei Zhang, Saratoga, CA (US); Haijing Hu, Los Gatos, CA (US); Haitong Sun, Cupertino, CA (US); Wei Zeng, Saratoga, CA (US); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/531,104

(22) Filed: Dec. 6, 2023

(65) Prior Publication Data
US 2024/0121757 A1    Apr. 11, 2024

Related U.S. Application Data

(63) Continuation of application No. 17/457,232, filed on Dec. 1, 2021.
(Continued)

(51) Int. Cl.
*H04W 72/02* (2009.01)
*H04W 72/044* (2023.01)
(Continued)

(52) U.S. Cl.
CPC ....... *H04W 72/02* (2013.01); *H04W 72/0473* (2013.01); *H04W 72/51* (2023.01);
(Continued)

(58) Field of Classification Search
None
See application file for complete search history.

(56) References Cited

U.S. PATENT DOCUMENTS

| | | | |
|---|---|---|---|
| 11,082,954 B2 * | 8/2021 | Huang | H04L 1/1819 |
| 11,765,690 B2 * | 9/2023 | Huang | H04W 72/0446 |
| | | | 370/329 |

(Continued)

FOREIGN PATENT DOCUMENTS

| | | |
|---|---|---|
| CN | 102083138 A | 6/2011 |
| CN | 104604322 A | 5/2015 |

(Continued)

OTHER PUBLICATIONS

U.S. Appl. No. 17/457,232, Final Office Action, Jul. 30, 2024, 9 pages.

(Continued)

*Primary Examiner* — Kodzovi Acolatse
(74) *Attorney, Agent, or Firm* — Dorsey & Whitney LLP

(57) ABSTRACT

Systems and methods for sidelink (SL) power control within wireless communication systems are disclosed herein. A user equipment (UE) selects a parameter set to use to calculate a transmit power of one or more channels to be transmitted according to an SL session with a peer UE from a plurality of parameter sets each configured for use according to a distance between the UE and the peer UE. A UE determines whether an SL pathloss based calculation is to be used to calculate a transmit power of a channel according to an SL session with a peer UE, wherein that calculation is configured to be used depending on a distance between the UE and the peer UE. UE selection of a number of physical SL feedback channel (PSFCH) transmissions to match a UE capability and determinations regarding whether to perform PSFCH reception or PSFCH transmission are also discussed.

6 Claims, 18 Drawing Sheets

Related U.S. Application Data

(60) Provisional application No. 63/137,353, filed on Jan. 14, 2021.

(51) Int. Cl.
*H04W 72/51* (2023.01)
*H04W 72/542* (2023.01)
*H04W 72/56* (2023.01)
*H04W 92/18* (2009.01)

(52) U.S. Cl.
CPC ......... *H04W 72/542* (2023.01); *H04W 72/56* (2023.01); *H04W 92/18* (2013.01)

(56) References Cited

U.S. PATENT DOCUMENTS

| | | | |
|---|---|---|---|
| 2019/0356451 A1* | 11/2019 | Zhang | H04L 5/0032 |
| 2020/0162864 A1* | 5/2020 | Lee | H04L 1/1671 |
| 2020/0205086 A1* | 6/2020 | Wang | H04W 52/243 |
| 2020/0252885 A1* | 8/2020 | Jiang | H04W 52/283 |
| 2020/0267523 A1* | 8/2020 | Tang | H04L 5/0064 |
| 2020/0280981 A1* | 9/2020 | Shin | H04W 72/0446 |
| 2021/0105728 A1 | 4/2021 | Nguyen et al. | |
| 2021/0105768 A1 | 4/2021 | Nguyen et al. | |
| 2021/0136628 A1* | 5/2021 | Uchiyama | H04W 28/18 |
| 2021/0168762 A1* | 6/2021 | Huang | H04L 1/1864 |
| 2021/0258887 A1* | 8/2021 | Osawa | H04W 52/242 |
| 2021/0297221 A1* | 9/2021 | Lee | H04L 5/0053 |
| 2021/0321385 A1 | 10/2021 | Lee et al. | |
| 2021/0385751 A1* | 12/2021 | Lee | H04W 52/0245 |
| 2021/0410084 A1* | 12/2021 | Li | H04W 52/265 |
| 2022/0053428 A1* | 2/2022 | Hwang | H04W 52/367 |
| 2022/0061120 A1* | 2/2022 | Deng | H04W 4/44 |
| 2022/0095327 A1* | 3/2022 | Wang | H04W 72/1263 |
| 2022/0132440 A1* | 4/2022 | Newman | G01S 5/0054 |
| 2022/0132486 A1* | 4/2022 | Aktas | H04W 72/541 |
| 2022/0201617 A1* | 6/2022 | Baek | H04W 52/24 |
| 2022/0210768 A1* | 6/2022 | Zhou | H04W 4/40 |
| 2022/0217649 A1 | 7/2022 | Lee et al. | |
| 2022/0217655 A1* | 7/2022 | Lee | H04W 52/325 |
| 2022/0217698 A1* | 7/2022 | Lee | H04W 4/029 |
| 2022/0225408 A1* | 7/2022 | Lee | H04W 72/20 |
| 2022/0264559 A1* | 8/2022 | Lee | H04W 52/367 |
| 2022/0279451 A1* | 9/2022 | Yoshioka | H04W 52/383 |
| 2022/0312387 A1* | 9/2022 | Ye | H04L 5/0053 |
| 2022/0337355 A1* | 10/2022 | Do | H04L 5/0055 |
| 2022/0346118 A1 | 10/2022 | Wu et al. | |
| 2022/0377761 A1* | 11/2022 | Lee | H04W 4/40 |
| 2022/0417867 A1* | 12/2022 | Yoshioka | H04W 52/242 |
| 2024/0032058 A1* | 1/2024 | Lee | H04W 76/28 |
| 2024/0057122 A1* | 2/2024 | Lee | H04W 52/0229 |
| 2024/0224301 A1* | 7/2024 | Kim | H04L 1/1896 |

FOREIGN PATENT DOCUMENTS

| | | | | |
|---|---|---|---|---|
| CN | 105722200 A | 6/2016 | | |
| CN | 107925906 A | 4/2018 | | |
| CN | 108924960 A | 11/2018 | | |
| CN | 109392069 A | 2/2019 | | |
| CN | 110476462 A | 11/2019 | | |
| WO | WO-2020167773 A1 * | 8/2020 | ........... H04L 1/1812 |
| WO | 2020200165 A1 | 10/2020 | | |
| WO | 2020209658 A1 | 10/2020 | | |
| WO | WO-2020251305 A1 * | 12/2020 | ........... H04B 17/318 |
| WO | WO-2020251314 A1 * | 12/2020 | ....... G08G 1/096783 |
| WO | WO-2021020954 A1 * | 2/2021 | ........... H04L 5/0053 |
| WO | 2021060936 A1 | 4/2021 | | |
| WO | WO-2021246804 A1 * | 12/2021 | ........... H04J 3/0635 |
| WO | WO-2022154466 A1 * | 7/2022 | ............. H04W 4/40 |

OTHER PUBLICATIONS

U.S. Appl. No. 17/457,232, Non-Final Office Action, Feb. 20, 2024, 13 pages.

U.S. Appl. No. 17/457,232, Non-Final Office Action, Sep. 26, 2023, 10 pages.

U.S. Appl. No. 18/531,176, Final Office Action, Oct. 28, 2024, 11 pages.

U.S. Appl. No. 18/531,131, Non-Final Office Action, Aug. 7, 2024, 9 pages.

U.S. Appl. No. 18/531,176, Non-Final Office Action, Aug. 6, 2024, 9 pages.

* cited by examiner

SYSTEMS AND METHODS FOR ENHANCEMENT ON SIDELINK POWER CONTROL

CROSS-REFERENCE TO RELATED APPLICATION(S)

This application is a continuation of U.S. patent application Ser. No. 17/457,232, entitled "SYSTEMS AND METHODS FOR ENHANCEMENT ON SIDELINK POWER CONTROL," filed Dec. 1, 2021, which claims the benefit of U.S. Provisional Patent Application No. 63/137,353, entitled "SYSTEMS AND METHODS FOR ENHANCEMENT ON SIDELINK POWER CONTROL," filed Jan. 14, 2021, each of which is hereby incorporated by reference herein in its entirety.

TECHNICAL FIELD

This application relates generally to wireless communication systems, including systems and methods for sidelink (SL) power control within wireless communication systems.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency bands for 5G NR may be separated into two different frequency ranges. Frequency Range 1 (FR1) may include frequency bands operating in sub-6 GHz frequencies, some of which are bands that may be used by previous standards, and may potentially be extended to cover new spectrum offerings from 410 MHz to 7125 MHz. Frequency Range 2 (FR2) may include frequency bands from 24.25 GHz to 52.6 GHz. Bands in the millimeter wave (mmWave) range of FR2 may have smaller coverage but potentially higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Multiple user equipment (UE) configured to operate as part of a wireless communication system (e.g., an NR and/or LTE wireless communication system) may be configured for sidelink (SL) communications as between one another and within the wireless communication system. SL communications may involve direct messaging between one or more UEs (e.g., messaging that passes from a UE to a peer UE without passing through another entity of the wireless communication system such as, for example, a base station). In some wireless communication systems, such SL communications occur on a PC5 interface.

Figure 1:
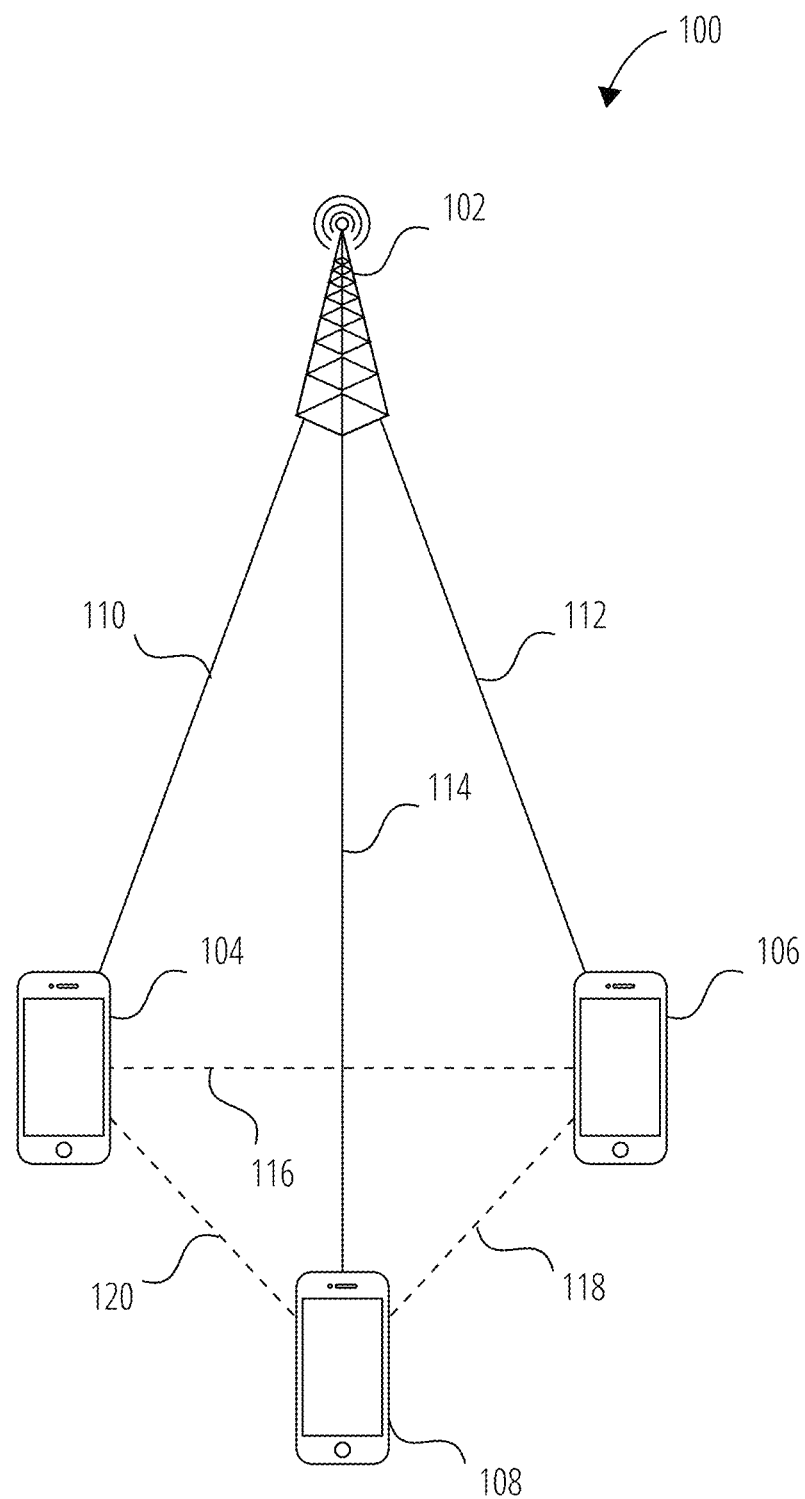
FIG. 1 illustrates a wireless communication system that is configured for sidelink (SL) communication, according to an embodiment.

FIG. 1 illustrates a wireless communication system 100 that is configured for SL communication, according to an embodiment. The wireless communication system 100 includes a base station 102, a first UE 104, a second UE 106, and a third UE 108. The wireless communication system 100 is given merely by way of example; other embodiments of wireless communication systems having more or less than these items are expressly contemplated.

The first UE 104 may communicate with the base station 102 on the first Uu interface 110. The second UE 106 may communicate with the base station 102 on the second Uu interface 112. The third UE 108 may communicate with the base station 102 on the third Uu interface 114.

Further, the first UE 104 and the second UE 106 may perform SL communications as between each other using the first PC5 interface 116. The second UE 106 and the third UE 108 may perform SL communications as between each other using the second PC5 interface 118. The third UE 108 and the first UE 104 may perform SL communications as between each other using the third PC5 interface 120. For purposes of this disclosure, from the perspective of each UE, a UE at the other end of a PC5 interface used by the UE may be a peer UE.

SL communications from one UE to a peer UE within a wireless communication system may be wireless transmissions having a transmission power. The energy attendant to such SL transmissions within a wireless communication system accordingly has the potential to interfere with other transmissions within the wireless communication system (e.g., downlink (DL) and/or uplink (UL) transmissions between a base station and another UE of the wireless communication system, and/or other SL transmissions between UEs of the wireless communication system). Accordingly, defining and controlling for the transmission power of an SL transmission by a UE using transmitter power control (TPC) metrics may allow an implementer of a wireless communication system that is configured to use/allow for such SL communications to plan for and/or compensate for the possible scope of such possible interferences within the wireless communication system.

The power at which an SL transmission is sent by a UE may be determined at the UE using a formula that uses one or more parameters. Through the use of the parameters with the formula, the UE may dynamically determine the power at which to send an SL transmission. The formula(s) (and corresponding parameter(s)) that are so used may vary based on a logical channel that is being sent as part of the SL communication. For example, formulas and/or parameters for TPC for an SL communication for any of a Physical Sidelink Shared Channel (PSSCH), a Physical Sidelink Control Channel (PSCCH), a Physical Sidelink Broadcast Channel (PSBCH), and a Physical Sidelink Feedback Channel (PSFCH) (among other possibilities) may vary in ways that will be further detailed below.

PSCCH and PSSCH Power Control

In some embodiments for PSCCH and/or PSSCH power control, a formula corresponding to DL pathloss may be used to control transmission power in the SL unicast case, the SL groupcast case, and/or the SL broadcast case. In some embodiments, a formula corresponding to SL pathloss may be used to control transmission power in the SL unicast case. Whether a formula corresponding to DL pathloss, a formula corresponding to SL pathloss, or both are used may be according to a configuration of the UE. When both are used, the minimum of the two resulting power levels may be implemented, as will be illustrated below. In each case, there may be separate sets of parameters used with formulas corresponding to DL pathloss and formulas corresponding to SL pathloss.

In these cases, SL reference signal received power (RSRP) measurement(s) for power control may be based on the PSSCH demodulation reference signal (DMRS). A UE that is to perform the SL transmission for which power control is to be implemented derives a pathloss estimation from a Layer3 (L3) sidelink RSRP report that may be accomplished using higher layer signaling, and for which the reference signal power is based on L3-filtered transmit (Tx) power with configured coefficients.

For PSCCH and/or PSSCH transmissions, a same power may be used for various symbols in a slot. For example, a PSCCH, an SL channel state information reference signal (CSI-RS), an SL phase tracking reference signal (PT-RS), a PSCCH-DMRS, and a PSSCH-DMRS may all be transmitted with the same power spectral density during a slot. In the case of a two antenna port PSSCH transmission, it may be that equal power is used for each antenna port.

The transmit power for a PSSCH symbol in slot i that is not frequency division multiplexed (FDMed) with PSCCH may then be calculated using the following formula:

$$P_{PSSCH}(i) = \min(P_{CMAX}, P_{MAX,CBR}, \min(P_{PSSCH,D}(i), P_{PSSCH,SL}(i))), \text{ where:}$$

$P_{CMAX}$ is a configured maximum output power for the UE;

$P_{MAX,CBR}$ is determined by a value of sl-MaxTxPower-r16 based on a priority level of the PSSCH transmission and a Channel Busy Ratio (CBR) range that includes a CBR measured in a slot prior to i; if sl-MaxTransPower-r16 is not provided, then $P_{MAX,CBR} = P_{CMAX}$;

$P_{PSSCH,D}(i)$ is calculated using:

$$P_{PSSCH,D}(i) = P_{O,D-PSSCH} + 10 \log_{10}(2^{\mu} \cdot M_{RB}^{PSSCH}(i)) + \alpha_{D-PSSCH} \cdot PL_D, \text{ where:}$$

$P_{O,D-PSSCH}$ is a nominal power value from dl-P0-PSSCH-PSCCH-r16 (if provided);

$\mu$ is an SCS configuration;

$M_{RB}^{PSSCH}(i)$ is a number of resource blocks for the PSSCH transmission occasion i;

$\alpha_{D-PSSCH}$ may be a value of dl-Alpha-PSSCH-PSCCH-r16, if provided; else, $\alpha_{D-PSSCH} = 1$; and $PL_D$ is the DL pathloss;

and $P_{PSSCH,SL}(i)$ is calculated using:

$$P_{PSSCH,SL}(i) = P_{O,SL-PSSCH} + 10 \log_{10}(2^{\mu} \cdot M_{RB}^{PSSCH}(i)) + \alpha_{SL-PSSCH} \cdot PL_{SL}, \text{ where:}$$

$P_{O,SL-PSSCH}$ is a nominal power value provided from a parameter set for the PSSCH;

$\mu$ is an SCS configuration;

$M_{RB}^{PSSCH}(i)$ is a number of resource blocks for the PSSCH transmission occasion i;

$\alpha_{SL-PSSCH}$ is a value provided from a parameter set for the PSSCH; and $PL_{SL}$ is the SL pathloss.

The transmit power for a PSSCH symbol in slot i that is FDMed with PSCCH can then be calculated using:

$$P'_{PSSCH}(i) = 10\log_{10}\left(\frac{M_{RB}^{PSSCH}(i) - M_{RB}^{PSCCH}(i)}{M_{RB}^{PSSCH}(i)}\right) + P_{PSSCH}(i),$$

where:

$M_{RB}^{PSSCH}(i)$ is a number of resource blocks for the PSSCH transmission occasion i; and $M_{RB}^{PSSCH}(i)$ is a number of resource blocks for the PSCCH transmission occasion i.

The transmit power for a PSCCH symbol in slot i is then calculated by:

$$P_{PSCCH}(i) = 10\log_{10}\left(\frac{M_{RB}^{PSCCH}(i)}{M_{RB}^{PSSCH}(i)}\right) + P_{PSSCH}(i),$$

where $M_{RB}^{PSSCH}(i)$ is a number of resource blocks for the PSSCH transmission occasion i; and $M_{RB}^{PSSCH}(i)$ is a number of resource blocks for the PSCCH transmission occasion i.

PSBCH Power Control

The transmit power for a PSBCH symbol in slot i is calculated by:

$P_{PSBCH,D}(i) = \min(P_{CMAX}, P_{O,S-SSB} + 10 \log_{10}(2^\mu \cdot M_{RB}^{S-SSB}(i)) + \alpha_{S-SSB} \cdot PL_D)$, where:

$P_{CMAX}$ is a configured maximum output power for the UE;

$P_{O,S-SSB}$ is a nominal power value provided from a parameter set for the PSBCH;

$\mu$ is an SCS configuration;

$M_{RB}^{S-SSB}(i)$ is a number of resource blocks for an SL synchronization signal (SS)/PSBCH block transmission;

$\alpha_{S-SSB}$ is a value provided from a parameter set for the PSBCH; and $PL_D$ is a DL pathloss.

PSFCH Power Control

If in coverage, the PSFCH power control may be based on the pathloss between a UE transmitting the PSFCH and a base station. The PSFCH power control may use parameters that are separately configured than those used for PSCCH and/or PSSCH power control (e.g., as discussed above). Further, simultaneous PSFCH transmissions in a single PSFCH TX occasion may be supported, based on UE capability.

The transmit power for a PSFCH symbol in slot i is calculated by:

$P_{PSFCH}(i) = P_{O,D-PSFCH} + 10 \log_{10}(2^\mu) + \alpha_{D-PSFCH} \cdot PL_D$, where:

$P_{O,D-PSFCH}$ is a nominal power value provided from a parameter set for the PSFCH corresponding to DL;

$\mu$ is an SCS configuration;

$\alpha_{D-PSFCH}$ is a value provided from a parameter set for the PSFCH corresponding to DL (if provided, else it is set to 1); and $PL_D$ is the DL pathloss.

When multiple PSFCH transmissions are to be performed in a single PSFCH transmit occasion, additional considerations may be used. For example, $N_{max,psfch}$ may represent a maximum number of simultaneous PSFCH transmissions in a single PSFCH transmit occasion that is supported (e.g., by a UE capability). $N_{req,psfch}$ may represent the number of scheduled PSFCH transmissions for the single PSFCH transmit occasion. In such cases, a UE may use $N_{max,psfch}$ and/or $N_{req,psfch}$ to select N PSFCHs for actual transmission with ascending order of PSFCH priority.

For example, when $P_{O,D-PSFCH}$ is pre-configured, the determination of N may be made according to whether an upper power limit would be reached. In the case that the upper power limit would not be reached, $N=\min(N_{max,psfch}, N_{req,psfch})$. This is permissible because the sum of $P_{O,D-PSFCH} + 10 \log_{10}(2^\mu) + \alpha_{D-PSF} \cdot PL_D$ for N PSFCHs is no more than $P_{CMAX}$, which is a configured maximum output power for the UE.

In the case that the upper power limit would be reached, the determination of N may instead be up to UE implementation, where N has a lower bound $$X = \max\left\{1, \sum_{j=1}^{K} M_j\right\},$$

where $M_j$ is the number of PFSCHs assigned with the priority j, and K is the largest value possible that does not lead to the power limited case.

In cases where $P_{O,D-PSFCH}$ is not pre-configured, N may be up to UE implementation (with a lower bound of 1), and the power of each PSFCH transmitted is $P_{CMAX} - 10 \log_{10}(N)$, where $P_{CMAX}$ is a configured maximum output power for the UE.

In cases contemplated herein, one or more parameter sets each corresponding to SL transmissions on one or more of the above-discussed logical channels may be provided to/at a UE. Each of the one or more parameter sets corresponding to each logical channel may be configured for use with the corresponding channel(s) according to a distance between the UE and the receiving peer UE.

Some such cases contemplate configuration of the UE by a base station of the wireless communication system that knows a distance between the UE and a peer UE, where such configuration causes the UE to select the appropriate (based on distance) parameters that are configured for use with the one or more channels according to the distance between the UE and the peer UE.

Other such cases contemplate closed-loop methods between UEs. In these methods, a UE may receive information regarding a distance between itself and a peer UE from the peer UE. Then, the appropriate formula for the channel(s) being sent is selected. Finally, parameters for the channel to be transmitted that correspond to the distance between the UE and the peer UE are used with the formula to calculate the transmission power.

It may be anticipated that various different use cases (and associated relevant SL ranges) are conceived for use within a wireless communication system. A non-limiting list of examples may include:

Vehicle platooning, including ranges from 80 to 350 meters

Advanced driving, including ranges from 360 to 700 meters

Extended sensor, including ranges from 50 to 1000 meters

Network Controlled Interactive Service (NCIS), including smaller transmission ranges Accordingly, the existence of one or more parameter sets corresponding to one (or more) channels for use with SL transmissions may be beneficial, in order to drive a transmission power calculation for a given use case to a result that is appropriate for a given SL distance within the use case (e.g., is powerful enough to reach a peer UE at a relevant distance, but is not unnecessarily powerful as to materially overshoot a possible peer UE distance and thus cause an unnecessarily powerful potential interference instance within the wireless communication system).

Some cases involve multiple such parameter sets that are each configured for use with the one (or more) channels according to a distance between the UE and the peer UE. In these cases, each of the multiple parameter sets may be configured for use for SL communication, and may be chosen between according to desired characteristics.

For example, it may be that a "normal" set of parameters for the channel(s) may cover various SL use cases up to (or up to and including) 1,000 meters. A "long" set of parameters (generally resulting in a higher transmission power result when used with the formula for the one (or more) channel(s) may be used in an SL case where the UE and the peer UE are greater than (or greater than or equal to) 1,000 meters apart. Divisions (each having a corresponding associated parameter set for the one (or more) channel(s) other than at 1,000 meters are contemplated (for example, parameter sets for a channel may be divided at 800 meters instead). It is expressly contemplated that two, three, or more such divisions may be made for the one (or more) channels (for example, parameter sets for one (or more) channel(s) may be divided at 500 meters and 900 meters, for a total of three parameter sets for the one (or more) channel(s)).

One such case where multiple parameter sets for SL power control may be made available corresponds to the use of SL transmissions for PSSCH and/or PSSCH. The UE may be configured with multiple parameter sets that are each configured for use for SL power control with PSSCH and/or PSSCH. Configuration with the multiple parameter sets for use in SL power control formulas may occur, for example, via communication with a base station. Selection at the UE among the multiple parameter sets configured for use in SL power control formulas for the PSSCH and/or PSCCH may be performed at the UE according to a distance between the UE and the peer UE that is the target of the SL communication.

For example, the UE may be configured with a first parameter set for use according to a first range of possible SL distances. The first parameter set may include a parameter configured for use as $P_{O,SL\text{-}PSSCH}$ and a parameter configured for use as $\alpha_{SL\text{-}PSSCH}$ in the formulas for PSSCH and/or PSSCH power control provided above. The first range of possible SL distances may be, for example, distances between 0 and 1,000 meters. In this case, the parameter configured for use as $P_{O,SL\text{-}PSSCH}$ may be an sl-P0-PSSCH-PSCCH-r16 parameter, and/or the parameter configured for use as $\alpha_{SL\text{-}PSSCH}$ may be an sl-Alpha-PSSCH-PSCCH-r16 parameter.

The UE may be further configured with a second parameter set for use according to a second range of possible SL distances. The second parameter set may include a parameter configured for use as $P_{O,SL\text{-}PSSCH}$ and a parameter configured for use as $\alpha_{SL\text{-}PSSCH}$ in the formulas for PSSCH and/or PSSCH power control provided above. The second range of possible SL distances may be, for example, distances greater than (or greater than or equal to) 1,000 meters. In this case, the parameter configured for use as $P_{O,SL\text{-}PSSCH}$ may be an sl-P0-PSSCH-PSCCH-Long parameter, and/or the parameter configured for use as $\alpha_{SL\text{-}PSSCH}$ may be an sl-Alpha-PSSCH-PSCCH-Long parameter.

Examples of UE behavior in order to select between parameter sets according to a range of possible SL distances will now be described.

Figure 2:
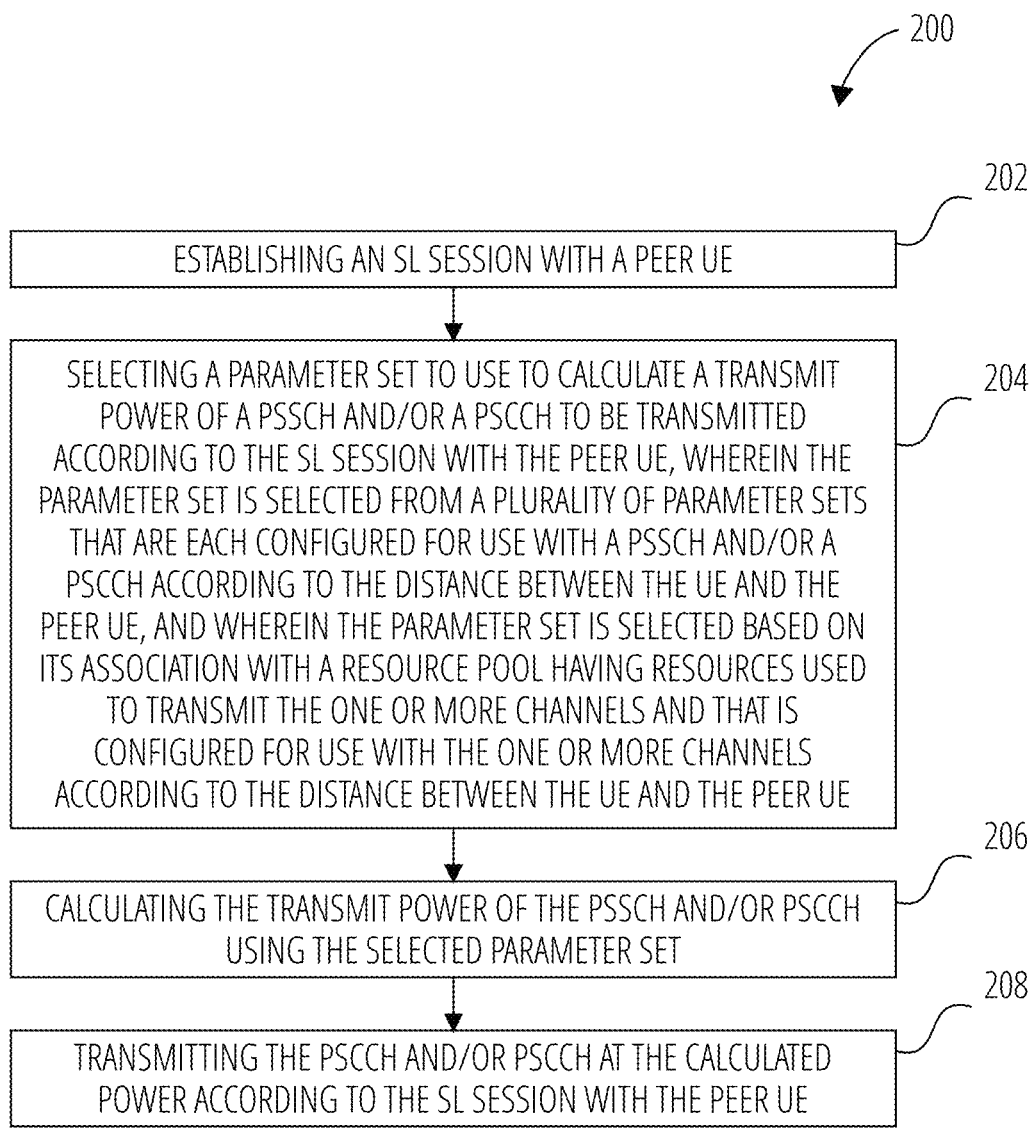
FIG. 2 illustrates a method of a user equipment (UE) for SL communication, according to an embodiment.

FIG. 2 illustrates a method 200 of a UE for SL communication, according to an embodiment. A UE may perform the method of FIG. 2 to determine a transmit power for a PSSCH and/or a PSCCH to be sent by the UE on an SL communication to a peer UE.

The method 200 includes establishing 202 an SL session with a peer UE.

The method 200 further includes selecting 204 a parameter set to use to calculate a transmit power of a PSSCH and/or a PSCCH to be transmitted according to the SL session with the peer UE, wherein the parameter set is selected from a plurality of parameter sets that are each configured for use with a PSSCH and/or a PSCCH according to the distance between the UE and the peer UE, and wherein the parameter set is selected based on its association with a resource pool having resources used to transmit the one or more channels and that is configured for use with the one or more channels according to the distance between the UE and the peer UE. In these cases, a base station of the wireless communication system may be aware of the distance between the UE and the peer UE, and may accordingly assign the UE to use a resource pool that is configured for use according to this distance. Then, the UE may select for use the parameter set from the plurality of parameter sets that is associated with the assigned resource pool (e.g., select the parameter set that corresponds to the distance for which the assigned resource pool is configured).

The method 200 further includes calculating 206 the transmit power of the PSSCH and/or PSCCH using the selected parameter set. As a non-limiting example, if the assigned resource pool is for SL communications of 0 to 1,000 meters, the selected parameter set (e.g., the parameter set associated with the assigned resource pool) may include an sl-P0-PSSCH-PSCCH-r16 parameter for use as $P_{O,SL\text{-}PSSCH}$ and an sl-Alpha-PSSCH-PSCCH-r16 parameter for use as $\alpha_{SL\text{-}PSSCH}$ within a PSSCH and/or PSCCH power control formula (such as the ones previously described). In the same non-limiting example, if the assigned resource pool is for SL communications of greater than (or greater than or equal to) 1,000 meters, the selected parameter set (e.g., the parameter set associated with the assigned resource pool) may instead include an sl-P0-PSSCH-PSCCH-Long parameter for use as $P_{O,SL\text{-}PSSCH}$ and an sl-Alpha-PSSCH-PSCCH-Long parameter for use $\alpha_{SL\text{-}PSSCH}$ within a PSSCH and/or PSCCH power control formula. The relevant parameters from the selected parameter set are accordingly used to perform a transmit power control calculation for the PSSCH and/or PSCCH.

The method 200 further includes transmitting 208 the PSSCH and/or PSCCH at the calculated power according to the SL session with the peer UE.

Figure 3:
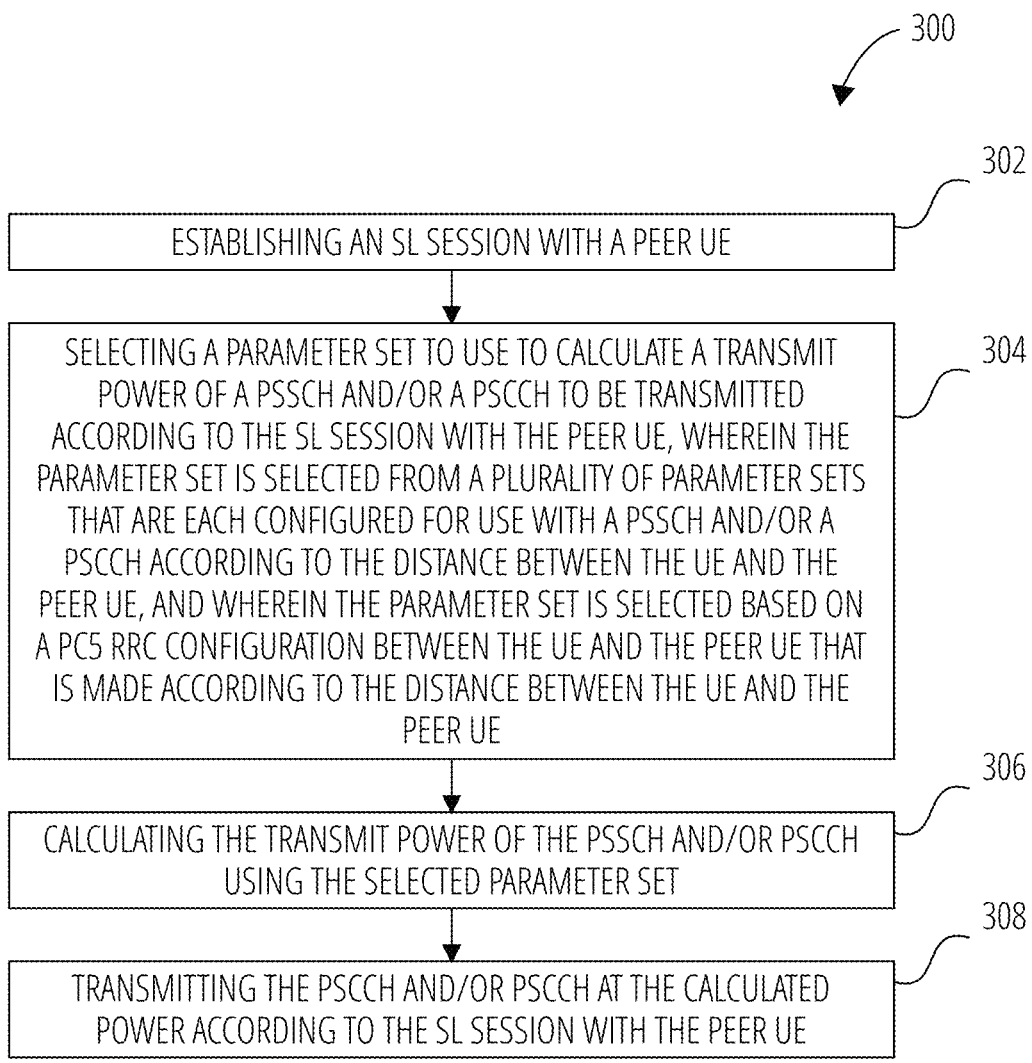
FIG. 3 illustrates a method of a UE for SL communication, according to an embodiment.

FIG. 3 illustrates a method 300 of a UE for SL communication, according to an embodiment. A UE may perform the method of FIG. 3 to determine a transmit power for a PSSCH and/or a PSCCH to be sent by the UE on an SL communication to a peer UE.

The method 300 includes establishing 302 an SL session with a peer UE.

The method 300 further includes selecting 304 a parameter set to use to calculate a transmit power of a PSSCH and/or a PSCCH to be transmitted according to the SL session with the peer UE, wherein the parameter set is selected from a plurality of parameter sets that are each configured for use with a PSSCH and/or a PSCCH according to the distance between the UE and the peer UE, and wherein the parameter set is selected based on a PC5 radio resource control (RRC) configuration between the UE and the peer UE that is made according to the distance between the UE and the peer UE. In these cases, a peer UE of the wireless communication system may be aware of the distance between the UE and a peer UE, and may accordingly instruct the UE to select the parameter set that corresponds to the distance.

The method 300 further includes calculating 306 the transmit power of the PSSCH and/or PSCCH using the selected parameter set. As a non-limiting example, if the UE is instructed to select a parameter set corresponding to a range of 0 to 1,000 meters, the selected parameter set corresponding to this range may include an sl-P0-PSSCH-PSCCH-r16 parameter for use as $P_{O,SL\text{-}PSSCH}$ and an sl-Alpha-PSSCH-PSCCH-r16 parameter for use as $\alpha_{SL\text{-}PSSCH}$ within a PSSCH and/or PSCCH power control formula (such as the ones previously described). In the same non-limiting example, if the UE is instructed to select a parameter set corresponding to a range of greater than (or greater than or equal to) 1,000 meters, the selected parameter set corresponding to this range may instead include an sl-P0-PSSCH-PSCCH-Long parameter for use as $P_{O,SL\text{-}PSSCH}$ and an sl-Alpha-PSSCH-PSCCH-Long parameter for use as $\alpha_{SL\text{-}PSSCH}$ within a PSSCH and/or PSCCH power control formula. The relevant parameters from the selected parameter set are accordingly used to perform a transmit power control calculation for the PSSCH and/or PSCCH.

The method 300 further includes transmitting 308 the PSCCH and/or PSCCH at the calculated power according to the SL session with the peer UE.

Figure 4:
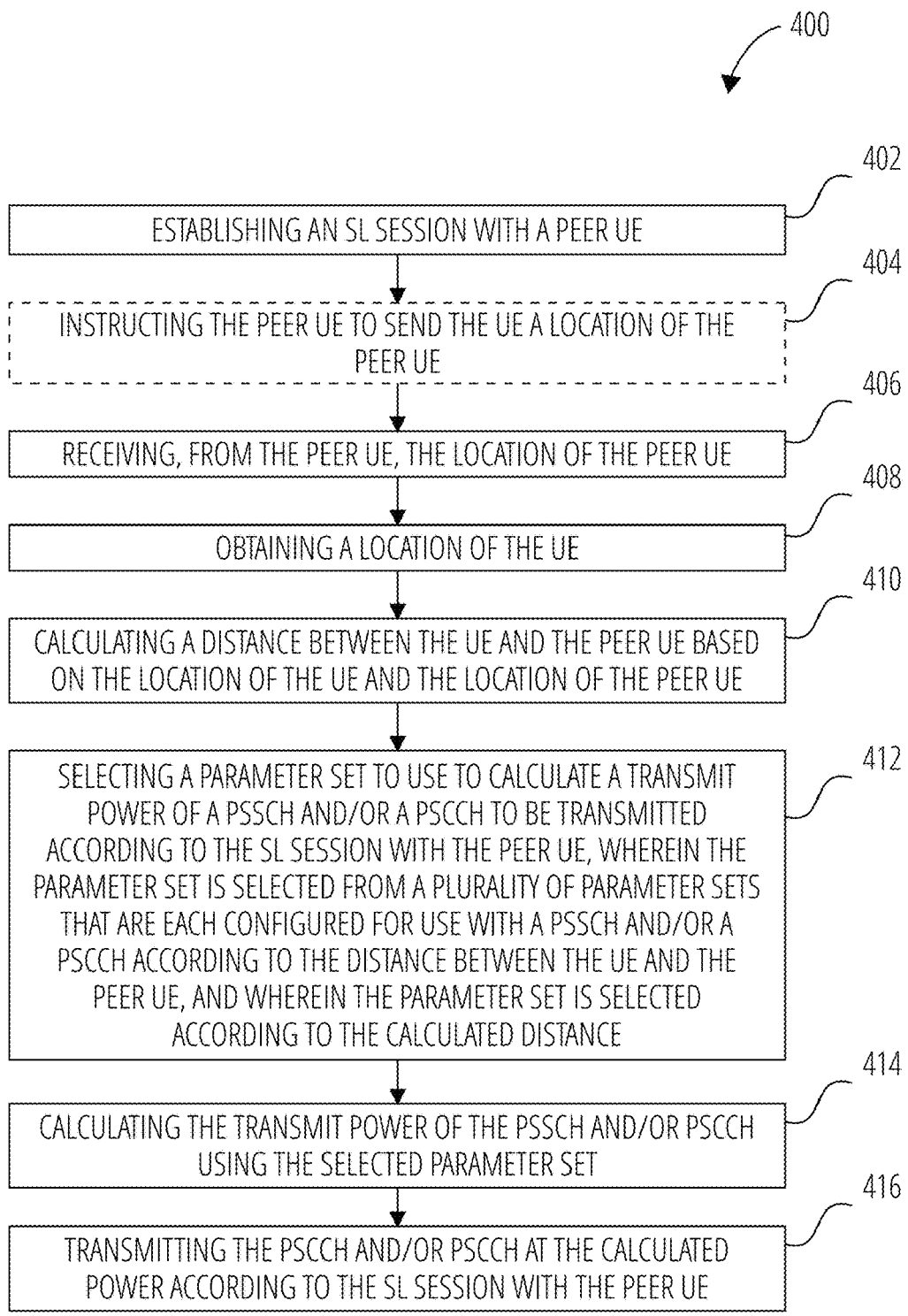
FIG. 4 illustrates a method of a UE for SL communication, according to an embodiment.

FIG. 4 illustrates a method 400 of a UE for SL communication, according to an embodiment. A UE may perform the method of FIG. 4 to determine a transmit power for a PSSCH and/or a PSCCH to be sent by the UE on an SL communication to a peer UE.

The method 400 includes establishing 402 an SL session with a peer UE.

The method 400 further optionally includes instructing 404 the peer UE to send the UE a location of the peer UE.

The method 400 further includes receiving 406, from the peer UE, the location of the peer UE. This reception may be in response to the instructing 404 earlier sent by the UE. In other embodiments, the peer UE may instead send the UE its location without such explicit instruction from the UE. For example, the peer UE may send the UE its location automatically when the SL session is first established, and/or when the peer UE's location has changed since the last time it was informed to the UE. In some embodiments, the peer UE sends a geo-location to the UE in a PSSCH. In other embodiments, the peer UE sends a zone ID for a zone in which the peer UE is located in one of an SL control information (SCI) stage 2 message, a medium access control (MAC) control element (MAC CE), or an RRC message.

The method 400 further includes obtaining 408 a location of the UE. This information may be in the form of a geo-location of the UE or a zone ID for a zone in which the UE is located. This information may be received from, for example, a base station of the wireless communication system.

The method 400 further includes calculating 410 a distance between the UE and the peer UE based on the location of the UE and the location of the peer UE.

The method 400 further includes selecting 412 a parameter set to use to calculate a transmit power of a PSSCH and/or a PSCCH to be transmitted according to the SL session with the peer UE, wherein the parameter set is selected from a plurality of parameter sets that are each configured for use with a PSSCH and/or a PSCCH according to the distance between the UE and the peer UE, and wherein the parameter set is selected according to the calculated distance. The selection may be made by matching the calculated distance to a range of possible SL distances for the selected one of the plurality of parameter sets.

The method 400 further includes calculating 414 the transmit power of the PSSCH and/or PSCCH using the selected parameter set. As a non-limiting example, if the calculated distance is within a first range of 0 to 1,000 meters, the selected parameter set corresponding to this range may include an sl-P0-PSSCH-PSCCH-r16 parameter for use as $P_{O,SL\text{-}PSSCH}$ and an si-Alpha-PSSCH-PSCCH-r16 parameter for use as $\alpha_{SL\text{-}PSSCH}$ within a PSSCH and/or PSCCH power control formula (such as the ones previously described). In the same non-limiting example, if the calculated distance is within a second range of greater than (or greater than or equal to) 1,000 meters, the selected parameter set corresponding to this range may instead include an sl-P0-PSSCH-PSCCH-Long parameter for use as $P_{O,SL\text{-}PSSCH}$ and an sl-Alpha-PSSCH-PSCCH-Long parameter for use as $\alpha_{SL\text{-}PSSCH}$ within a PSSCH and/or PSCCH power control formula. The relevant parameters from the selected parameter set are accordingly used to perform a transmit power control calculation for the PSSCH and/or PSCCH.

The method 400 further includes transmitting 416 the PSCCH and/or PSCCH at the calculated power according to the SL session with the peer UE.

Figure 5:
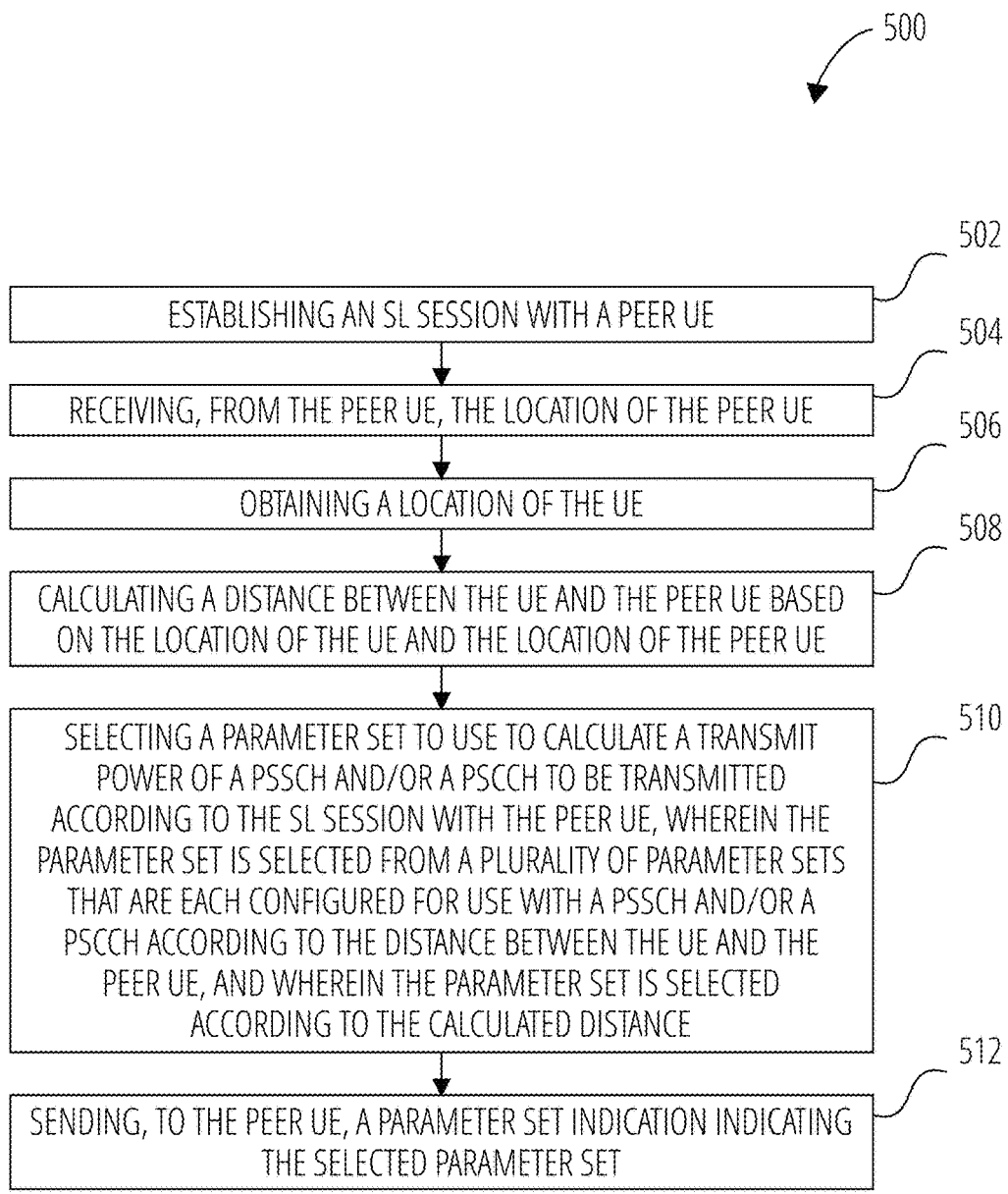
FIG. 5 illustrates a method of a UE for SL communication, according to an embodiment.

FIG. 5 illustrates a method 500 of a UE for SL communication, according to an embodiment. A UE may perform the method of FIG. 5 to determine a parameter set indication to make to a peer UE, enabling the peer UE to perform power control calculations for PSSCH and/or PSCCH on SL with the indicated parameter set.

The method 500 includes establishing 502 an SL session with a peer UE.

The method 500 further includes receiving 504, from the peer UE, the location of the peer UE. In some embodiments, the peer UE sends a geo-location to the UE in a PSSCH. In other embodiments, the peer UE sends a zone ID for a zone in which the peer UE is located in one of a SCI stage 2 message, a MAC CE, or an RRC message. The receiving 504 of the location of the peer UE may be a trigger for the UE for the remaining portions of the method 500.

The method 500 further includes obtaining 506 a location of the UE. This information may be in the form of a geo-location of the UE or a zone ID for a zone in which the UE is located. This information may be received from, for example, a base station of the wireless communication system.

The method 500 further includes calculating 508 a distance between the UE and the peer UE based on the location of the UE and the location of the peer UE.

The method 500 further includes selecting 510 a parameter set to use to calculate a transmit power of a PSSCH and/or a PSCCH to be transmitted according to the SL session with the peer UE, wherein the parameter set is selected from a plurality of parameter sets that are each configured for use with a PSSCH and/or a PSCCH according to the distance between the UE and the peer UE, and wherein the parameter set is selected according to the calculated distance. The selection may be made by matching the calculated distance to a range of possible SL distances for the selected one of the plurality of parameter sets (e.g., by comparing to one or more thresholds for each of the plurality of parameter sets).

The method 500 further includes sending 512 to the peer UE, a parameter set indication indicating the selected parameter set. This parameter set indication may identify the parameter set that the peer UE is to use to perform power control calculations for PSSCH and/or PSCCH on SL when the peer UE sends the PSSCH and/or PSCCH to the UE. The parameter set indication may be in the form of a single bit (e.g., in the case where only two parameter sets are configured at each UE, and only a binary indication is accordingly needed). In some embodiments, the parameter set indication may be jointly coded with a PSFCH that is responsive to a PSSCH or PSCCH from the peer UE that the peer UE uses as part of the method 500.

Figure 6:
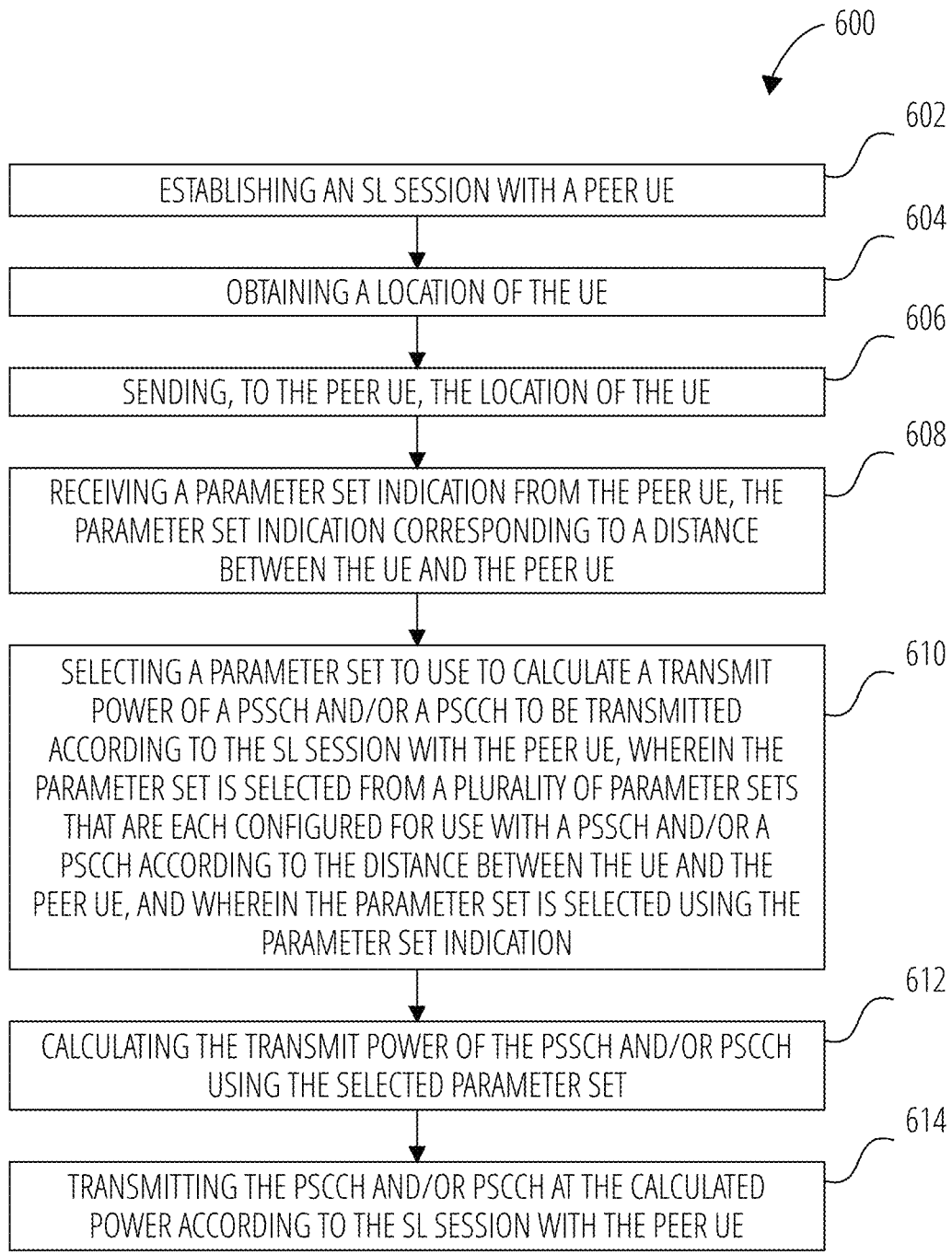
FIG. 6 illustrates a method of a UE for SL communication, according to an embodiment.

FIG. 6 illustrates a method 600 of a UE for SL communication, according to an embodiment. A UE may perform the method of FIG. 6 to determine a transmit power for a PSSCH and/or a PSCCH to be sent by the UE on an SL communication to a peer UE.

The method 600 includes establishing 602 an SL session with a peer UE.

The method 600 further includes obtaining 604 a location of the UE. This information may be in the form of a geo-location of the UE or a zone ID for a zone in which the UE is located. This information may be received from, for example, a base station of the wireless communication system.

The method 600 further includes sending 606, to the peer UE, the location of the UE. In some embodiments, the UE sends a geo-location to the peer UE in a PSSCH. In other embodiments, the UE sends a zone ID for a zone in which the UE is located in one of an SCI stage 2 message, a MAC CE, or an RRC message.

The method 600 further includes receiving 608 a parameter set indication from the peer UE, the parameter set indication corresponding to a distance between the UE and the peer UE. This parameter set indication may identify the parameter set that the UE is to use to perform power control calculations for PSSCH and/or PSCCH on SL when the UE sends the PSSCH and/or PSCCH to the peer UE. The parameter set indication may be in the form of a single bit (e.g., in the case where only two parameter sets are configured at the UE, and only a binary indication is accordingly needed). In some embodiments, the parameter set indication may be jointly coded with a PSFCH that is responsive to a PSSCH or PSCCH sent to the peer UE as part of the method 600.

The method 600 further includes selecting 610 a parameter set to use to calculate a transmit power of a PSSCH and/or a PSCCH to be transmitted according to the SL session with the peer UE, wherein the parameter set is selected from a plurality of parameter sets that are each configured for use with a PSSCH and/or a PSCCH according to the distance between the UE and the peer UE, and wherein the parameter set is selected using the parameter set indication.

The method 600 further includes calculating 612 the transmit power of the PSSCH and/or PSCCH using the selected parameter set. As a non-limiting example, in the case where a parameter set corresponding to a range of 0 to 1,000 meters is indicated for use in the parameter set indication, it may include an sl-P0-PSSCH-PSCCH-r16 parameter for use as $P_{O,SL\text{-}PSSCH}$ and an sl-Alpha-PSSCH-PSCCH-r16 parameter for use as $\alpha_{SL\text{-}PSSCH}$ within a PSSCH and/or PSCCH power control formula (such as the ones previously described). In the same non-limiting example, in the case where a parameter set corresponding to a range of greater than (or greater than or equal to) 1,000 meters is indicated for use in the parameter set indication, it may instead include an sl-P0-PSSCH-PSCCH-Long parameter for use as $P_{O,SL\text{-}PSSCH}$ and an sl-Alpha-PSSCH-PSCCH-Long parameter for use as $\alpha_{SL\text{-}PSSCH}$ within a PSSCH and/or PSCCH power control formula. The relevant parameters from the selected parameter set are accordingly used to perform a transmit power control calculation for the PSSCH and/or PSCCH.

The method 600 further includes transmitting 614 the PSCCH and/or PSCCH at the calculated power according to the SL session with the peer UE.

While configurations for a first and second parameter set corresponding to first and second ranges of possible SL distances for PSSCH and/or PSCCH have been described, it is contemplated that methods disclosed herein could be used by a UE to select between any number of parameter sets corresponding to any number of ranges of possible SL distances that are each configured for use with PSSCH and/or PSCCH according to a distance between the UE and the peer UE.

Further, while discussion herein in FIG. 2 through FIG. 6 has discussed the methods therein by using PSSCH and/or PSCCH as a specific example, it is anticipated that the methods discussed in those figures could be similarly applied in the case of any channel for which multiple parameter sets that are each configured for use with the channel according to a distance between the UE and the peer UE.

Another case where multiple parameter sets for SL power control may be made available corresponds to the use of transmissions for PSBCH. The UE may be configured with multiple parameter sets that are each configured for use with PSBCH. Configuration with the multiple parameter sets for use in power control formulas may occur, for example, via communication with a base station. Selection at the UE among the multiple parameter sets configured for use in power control formulas for the PSBCH may be performed at the UE according to a distance between the UE and a peer UE that is the target of the SL communication. In view of the broadcast nature of the PSBCH, when the UE is sending the PSBCH to more than one peer UE with which the UE has established an SL session, the relevant distance used for PSBCH-related calculations may be a distance from the peer UE that is the furthest from the UE.

For example, the UE may be configured with a first parameter set for use according to a first range of possible SL distances. The first parameter set may include a parameter configured for use as $P_{O,S\text{-}SSB}$ and a parameter configured for use as $\alpha_{S\text{-}SSB}$ in the formulas for PSBCH power control provided above. The first range of possible SL distances may be, for example, distances between 0 and 1,000 meters. In this case, the parameter configured for use as $P_{O,S\text{-}SSB}$ may be a dl-P0-PSBCH-r16 parameter, and/or the parameter configured for use as $\alpha_{S\text{-}SSB}$ may be a dl-Alpha-PSBCH-r16 parameter.

The UE may be further configured with a second parameter set for use according to a second range of possible SL distances. The second parameter set may include a parameter configured for use as $P_{O,S\text{-}SSB}$ and a parameter configured for use as $\alpha_{S\text{-}SSB}$ in the formulas for PSBCH power control provided above. The second range of possible SL distances may be, for example, distances greater than (or greater than or equal to) 1,000 meters. In this case, the parameter configured for use as $P_{O,S\text{-}SSB}$ may be a dl-P0-PSBCH-Long parameter, and/or the parameter configured for use as $\alpha_{S\text{-}SSB}$ may be an dl-Alpha-PSBCH-Long parameter.

Examples of UE behavior in order to select between parameter sets according to a range of possible SL distances will now be described.

Figure 7:
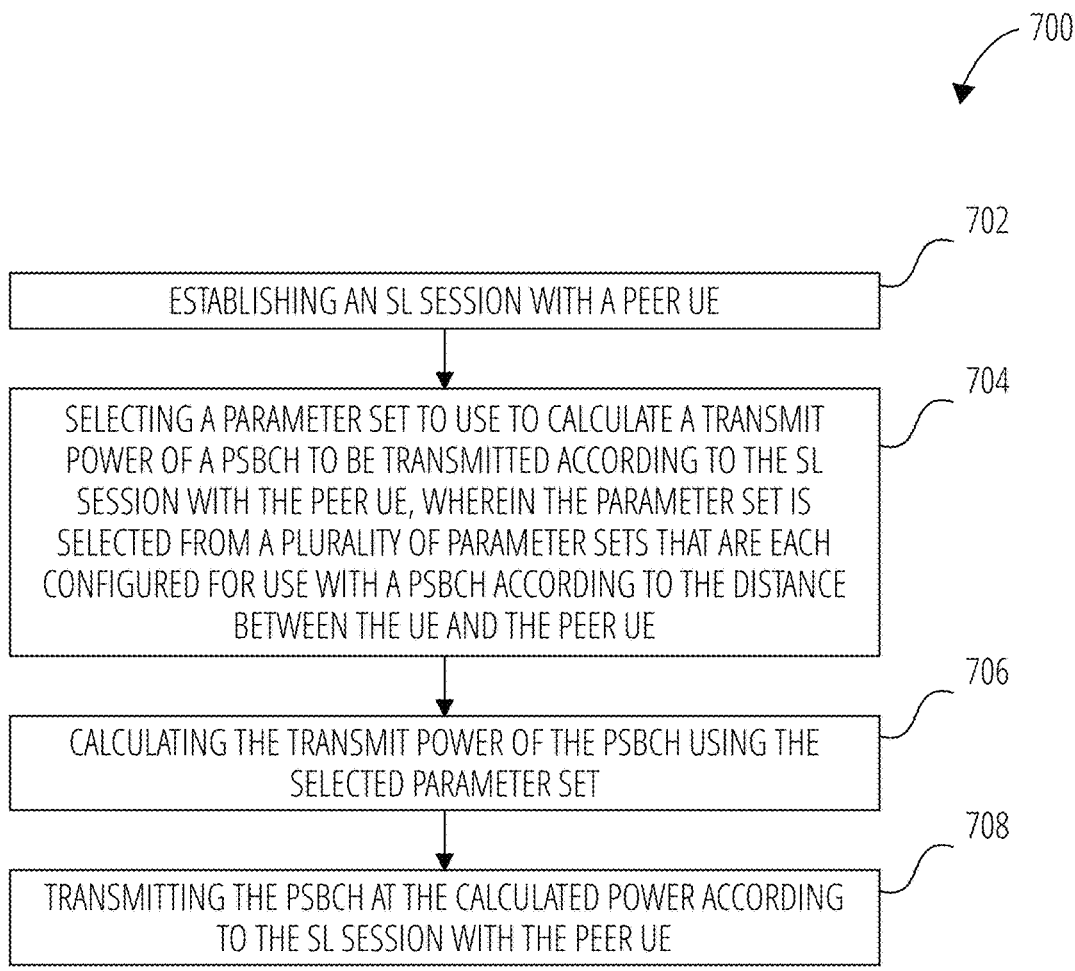
FIG. 7 illustrates a method of a UE for SL communication, according to an embodiment.

FIG. 7 illustrates a method 700 of a UE for SL communication, according to an embodiment. A UE may perform the method of FIG. 7 to determine a transmit power for a PSBCH to be sent by the UE on an SL communication to a peer UE.

The method 700 includes establishing 702 an SL session with a peer UE.

The method 700 further includes selecting 704 a parameter set to use to calculate a transmit power of a PSBCH to be transmitted according to the SL session with the peer UE, wherein the parameter set is selected from a plurality of parameter sets that are each configured for use with a PSBCH according to the distance between the UE and the peer UE. The selection may be made by matching a distance between the UE and the peer UE to a range of possible SL distances for the selected one of the plurality of parameter sets (e.g., by comparing to one or more thresholds for each of the plurality of parameter sets).

The method 700 further includes calculating 706 the transmit power of the PSBCH using the selected parameter set. As a non-limiting example, if the calculated distance is within a first range of 0 to 1,000 meters, the selected parameter set corresponding to this range may include a dl-P0-PSBCH-r16 parameter for use as $P_{O,S\text{-}SSB}$ and a dl-Alpha-PSBCH-r16 parameter for use as $\alpha_{S\text{-}SSB}$ within a PSBCH power control formula (such as the one previously described). In the same non-limiting example, if the calculated distance is within a second range of greater than (or greater than or equal to) 1,000 meters, the selected parameter set corresponding to this range may instead include a dl-P0-PSBCH-Long parameter for use as $P_{O,S\text{-}SSB}$ and a dl-Alpha-PSBCH-Long parameter for use as $\alpha_{S\text{-}SSB}$ within a PSBCH power control formula. The relevant parameters from the selected parameter set are accordingly used to perform a transmit power control calculation for the PSBCH.

The method 700 further includes transmitting 708 the PSBCH at the calculated power according to the SL session with the peer UE.

While configurations for a first and second parameter set corresponding to first and second ranges of possible SL distances for PSBCH have been described, it is contemplated that methods disclosed herein could be used by a UE to select between any number of parameter sets corresponding to any number of ranges of possible SL distances that are each configured for use with PSBCH according to a distance between the UE and the peer UE.

While discussion herein in FIG. 7 has discussed the methods therein by using PSBCH as a specific example, it is anticipated that the methods discussed in FIG. 7 could be similarly applied in the case of any channel for which multiple parameter sets that are each configured for use with the channel according to a distance between the UE and the peer UE.

In some cases, it may be that the provision (and subsequent potential use) of a set of SL-specific parameters (e.g., that contemplate an SL pathloss based calculation) can be leveraged to more appropriately apply power control for SL communications. The use of such SL-specific parameters be particularly helpful in cases where a formula for a channel in an unmodified case uses (only) a DL-specific set of parameters (e.g., that contemplates DL pathloss based calculation) for SL power control.

One such case may be for SL power control methods for PSFCH. As discussed above, one formula for calculating the transmit power for a PSFCH is $P_{PSFCH}(i)=P_{O,D\text{-}PSFCH}+10 \log_{10}(2^\mu)+\alpha_{D\text{-}PSFCH}\cdot PL_D$. However, this formula calls for the use of (only) DL-specific parameters (and therefore may be said to be DL pathloss based). It is contemplated that a second formula (that calls for the use of SL-specific parameters, and therefore may be said to be DL pathloss based) could be used (either separately, or in conjunction with this formula) to improve the power calculations for PSFCH SL transmissions within the wireless communication system.

One overall formula representing a use of both DL pathloss based calculations and SL pathloss based calculations may be expressed generally in the following manner:

$$P_{PSFCH}(i)=\min(P_{CMAX},P_{MAX,CBR},\min(P_{PSFCH,D}(i), P_{PSFCH,SL}(i))), \text{ where:}$$

$P_{CMAX}$ is a configured maximum output power for the UE;
$P_{MAX,CBR}$ is determined by a value of sl-MaxTxPower-r16 based on a priority level of a PSSCH and/or PSCCH transmission triggering the PSFCH and a CBR range that includes a CBR measured in slot prior to i; if sl-MaxTransPower-r16 is not provided, then $P_{MAX,CBR}=P_{CMAX}$;
$P_{PSFCH,D}(i)=P_{O,D\text{-}PSFCH}+10 \log_{10}(2^\mu)+\alpha_{D\text{-}PSFCH}\cdot PL_D$ (note that the DL pathloss based formula previously discussed is now denoted $P_{PSFCH,D}(i)$) and
$P_{PSPCH,SL}(i)$ (an SL pathloss based formula) is calculated using:

$$P_{PSPCH,SL}(i)=P_{O,SL\text{-}PSFCH}+10 \log_{10}(2^\mu)+\alpha_{SL\text{-}PSFCH}\cdot PL_{SL}, \text{ where}$$

$P_{O,SL\text{-}PSFCH}$ is a nominal power value provided from a parameter set for the PSFCH;
$\mu$ is an SCS configuration;
$\alpha_{SL\text{-}PSFCH}$ is a value provided from a parameter set for the PSFCH; and
$PL_{SL}$ is an SL pathloss.

In these cases, certain power control parameters for use with PSFCH according to SL (e.g., parameters configured for use as $P_{O,SL\text{-}PSFCH}$ and/or $\alpha_{SL\text{-}PSFCH}$) may be configured independently from parameters for use with PSFCH according to DL (e.g., from parameters configured for use as $P_{O,DL\text{-}PSFCH}$ and/or $\alpha_{DL\text{-}PSFCH}$). Further, it is contemplated that certain power control parameters for use with PSFCH according to SL (e.g., parameters configured for use as $P_{O,SL\text{-}PSFCH}$ and/or $\alpha_{SL\text{-}PSFCH}$) may be configured independently from parameters for use with PSSCH and/or PSCCH according to SL (e.g., from parameters configured for use as $P_{O,D\text{-}PSSCH}$ and/or $\alpha_{D\text{-}PSSCH}$).

It is contemplated that a parameter configured for use as $P_{O,SL\text{-}PSFCH}$ may be an sl-P0-PSFCH parameter, and that a parameter configured for use as $\alpha_{SL\text{-}PSFCH}$ may be an sl-Alpha-PSFCH parameter.

Whether a joint application that uses power control parameters for use with PSFCH according to both SL and DL pathloss is to be used to calculate the transmit power of the PSFCH (as in, for example, the above formula $$P_{PSFCH}(i)=\min(P_{CMAX},P_{MAX,CBR},\min(P_{PSFCH,D}(i), P_{PSFCH,SL}(i))))$$

versus using, for example, (only):

$$P_{PSFCH,D}(i)=P_{O,D\text{-}PSFCH}+10 \log_{10}(2^\mu)+\alpha_{D\text{-}PSFCH}\cdot PL_D$$

(similar to the manner previously described) may turn on the SL distance between a UE and a peer UE to which the UE is transmitting the PSFCH. As one non-limiting example, the formula corresponding to both SL and DL pathloss may be used in cases where the distance between the UE and the peer UE is between 0 and 1,000 meters. The use of this formula in this case may account for the (relatively) shorter distance between the UE and the peer UE, which may be likely to not have a same/similar range as UL/DL signals (and therefore it may make sense to consider SL-specific parameters). As part of the same non-limiting example, the formula corresponding to only DL pathloss may be used in cases where the distance between the UE and the peer UE is greater than (or greater than or equal to 1,000 meters). The use of this formula in this case may account for the (relatively) longer distance between the UE and the peer UE, which may be likely to have a same/similar range as UL/DL signals (and therefore it may make sense to consider (only) DL-specific parameters).

Figure 8:
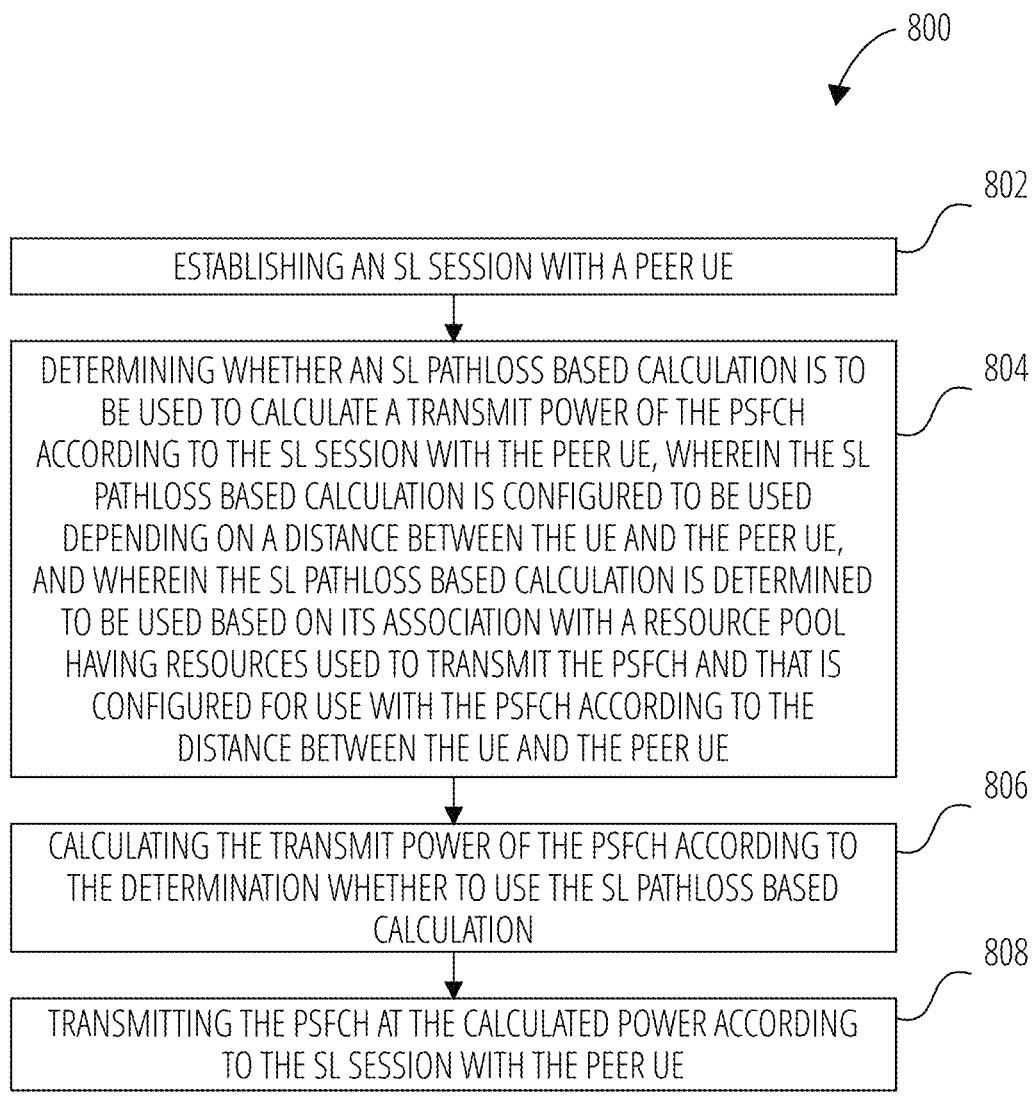
FIG. 8 illustrates a method of a UE for SL communication, according to an embodiment.

FIG. 8 illustrates a method 800 of a UE for SL communication, according to an embodiment. A UE may perform the method of FIG. 8 to determine a transmit power for a PSFCH to be sent by the UE on an SL communication to a peer UE.

The method 800 includes establishing 802 an SL session with a peer UE.

The method 800 further includes determining 804 whether an SL pathloss based calculation is to be used to calculate a transmit power of the PSFCH according to the SL session with the peer UE, wherein the SL pathloss based calculation is configured to be used depending on a distance between the UE and the peer UE, and wherein the SL pathloss based calculation is determined to be used based on its association with a resource pool having resources used to transmit the PSFCH and that is configured for use with the PSFCH according to the distance between the UE and the peer UE. In these cases, a base station of the wireless communication system may be aware of the distance between the UE and the peer UE, and may accordingly assign the UE to use a resource pool that is configured for use according to this distance. Then, the UE may determine whether to use the SL pathloss based calculation based on whether such a use is associated with the use of assigned resource pool.

The method 800 further includes calculating 806 the transmit power of the PSFCH according to the determination whether to use the SL pathloss based calculation. As a non-limiting example, if the determination was made to use the SL pathloss based calculation, the transmit power of the PSFCH may be calculated using $P_{PSFCH}(i)=\min(P_{CMAX}, P_{MAX,CBR}, \min(P_{PSFCH,D}(i), P_{PSFCH,SL}(i)))$ (as that formula is detailed above, including the use of an sl-P0-PSFCH parameter for $P_{O,SL\text{-}PSFCH}$ and an sl-Alpha-PSFCH parameter for $\alpha_{SL\text{-}PSFCH}$). In the same non-limiting example, if the determination was made to not use the SL pathloss based calculation, the transmit power of the PSFCH may be calculated using (only) $P_{PSFCH,D}(i)=P_{O,D\text{-}PSFCH}+10 \log_{10}(2^\mu)+\alpha_{D\text{-}PSFCH}\cdot PL_D$.

The method 800 further includes transmitting 808 the PSFCH at the calculated power according to the SL session with the peer UE.

Figure 9:
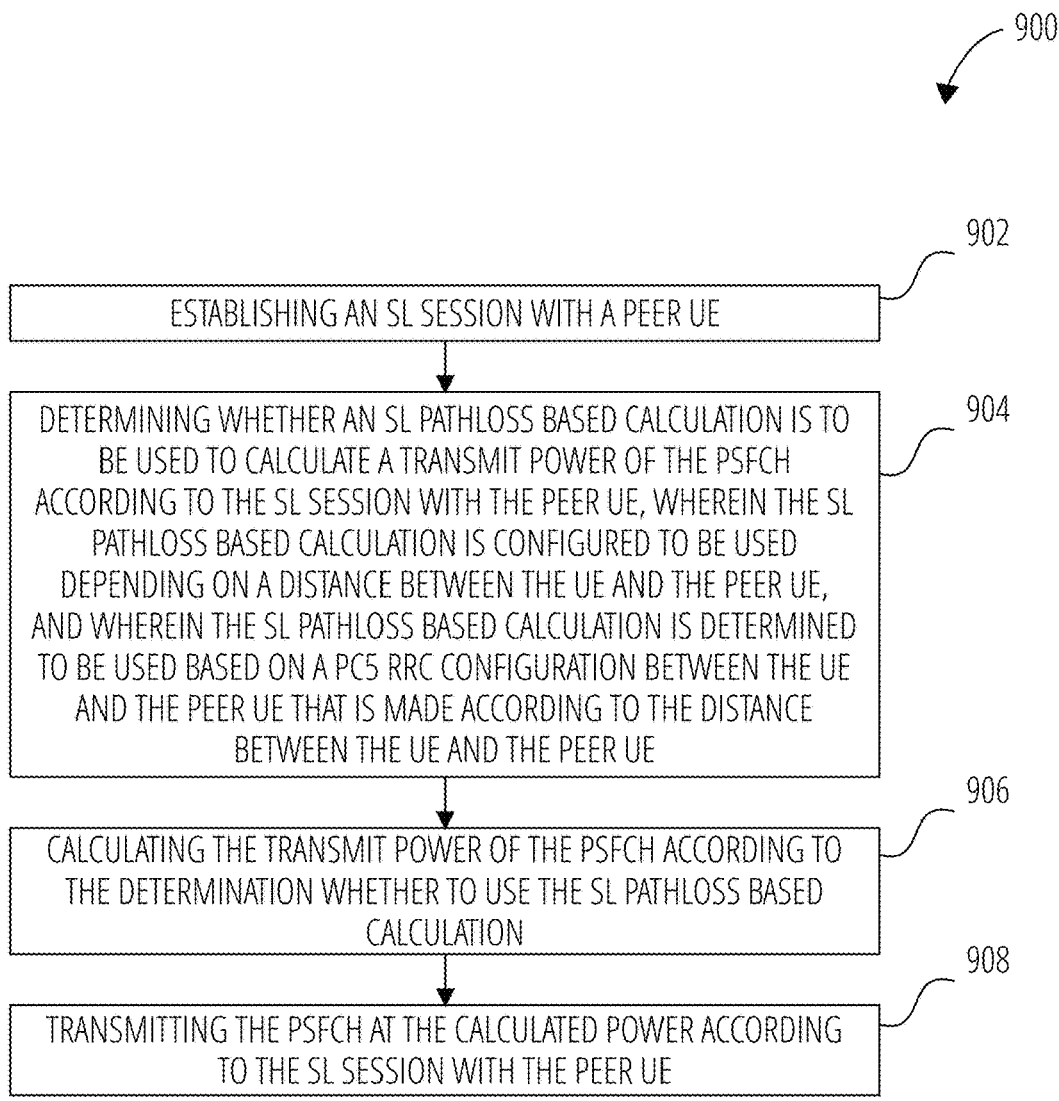
FIG. 9 illustrates a method of a UE for SL communication, according to an embodiment.

FIG. 9 illustrates a method 900 of a UE for SL communication, according to an embodiment. A UE may perform the method of FIG. 9 to determine a transmit power for a PSFCH to be sent by the UE on an SL communication to a peer UE.

The method 900 includes establishing 902 an SL session with a peer UE.

The method 900 further includes determining 904 whether an SL pathloss based calculation is to be used to calculate a transmit power of the PSFCH according to the SL session with the peer UE, wherein the SL pathloss based calculation is configured to be used depending on a distance between the UE and the peer UE, and wherein the SL pathloss based calculation is determined to be used based on a PC5 RRC configuration between the UE and the peer UE that is made according to the distance between the UE and the peer UE. In these cases, a peer UE may be aware of the distance between the UE and the peer UE, and may accordingly instruct the UE whether to use the SL pathloss based calculation.

The method 900 further includes calculating 906 the transmit power of the PSFCH according to the determination whether to use the SL pathloss based calculation. As a non-limiting example, if the determination was made to use the SL pathloss based calculation, the transmit power of the PSFCH may be calculated using $P_{PSFCH}(i)=\min(P_{CMAX}, P_{MAX,CBR}, \min(P_{PSFCH,D}(i), P_{PSFCH,SL}(i)))$ (as that formula is detailed above, including the use of an sl-P0-PSFCH parameter for $P_{O,SL\text{-}PSFCH}$ and an sl-Alpha-PSFCH parameter for $\alpha_{SL\text{-}PSFCH}$). In the same non-limiting example, if the determination was made to not use the SL pathloss based calculation, the transmit power of the PSFCH may be calculated using (only) $P_{PSFCH,D}(i)=P_{O,D\text{-}PSFCH}+10 \log_{10}(2^\mu)+\alpha_{D\text{-}PSFCH}\cdot PL_D$.

The method 900 further includes transmitting 908 the PSFCH at the calculated power according to the SL session with the peer UE.

Figure 10:
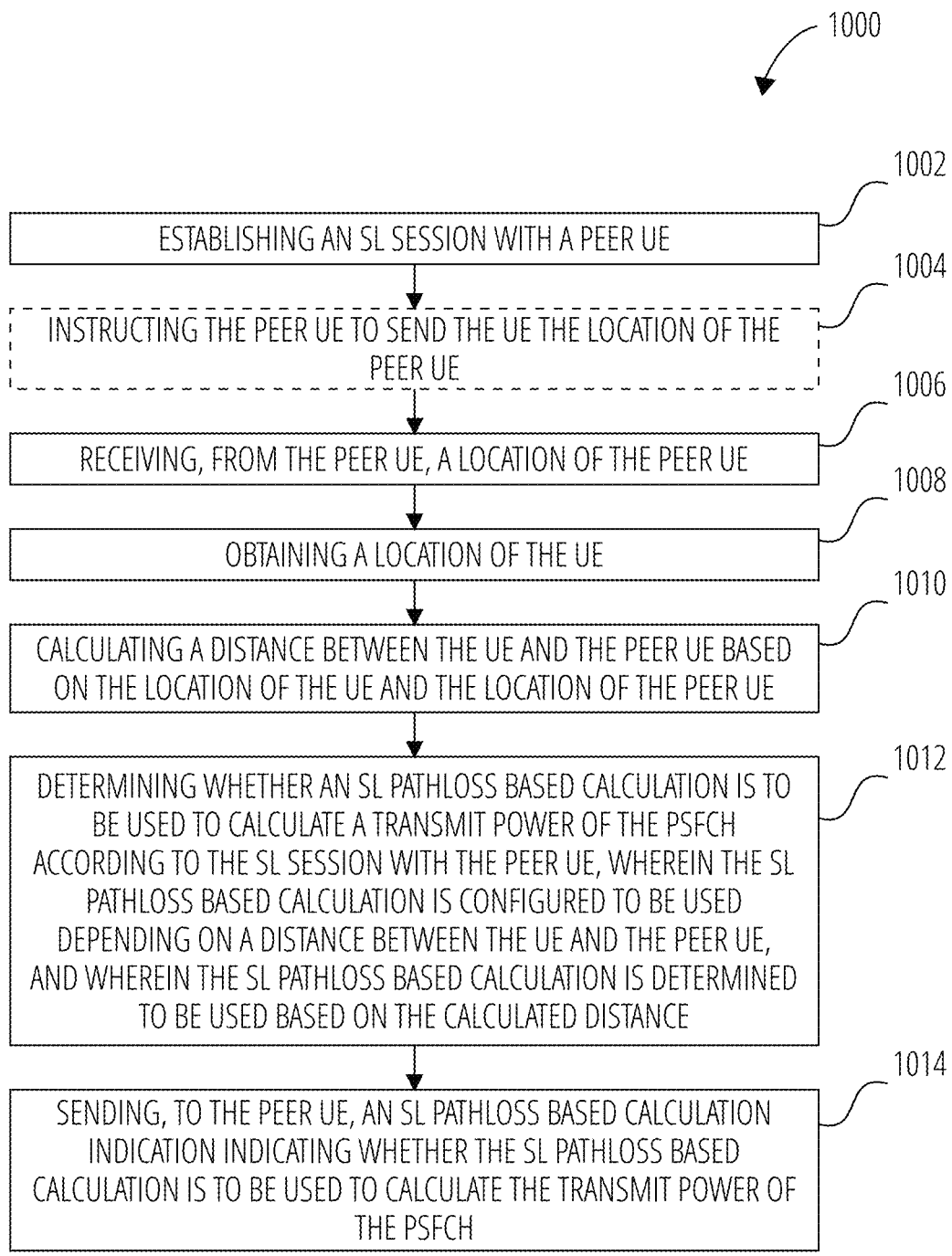
FIG. 10 illustrates a method of a UE for SL communication, according to an embodiment.

FIG. 10 illustrates a method 1000 of a UE for SL communication, according to an embodiment. A UE may perform the method of FIG. 10 to determine an SL pathloss based calculation indication to make to a peer UE, enabling the peer UE to perform power control calculations for PSFCH on SL according to a determination performed at the UE of whether to use the SL pathloss based calculation.

The method 1000 includes establishing 1002 an SL session with a peer UE.

The method 1000 further optionally includes instructing 1004 the peer UE to send the UE the location of the peer UE.

The method 1000 further includes receiving 1006, from the peer UE, a location of the peer UE. This reception may be in response to the instructing 1004 earlier sent by the UE. In other embodiments, the peer UE may instead send the UE its location without such explicit instruction from the UE. For example, the peer UE may send the UE its location automatically when the SL session is first established, and/or when the peer UE's location has changed since the last time it was informed to the UE. In some embodiments, the peer UE sends a geo-location to the UE in a PSSCH. In other embodiments, the peer UE sends a zone ID for a zone in which the peer UE is located in one of an SCI stage 2 message, a MAC CE, or an RRC message.

The method 1000 further includes obtaining 1008 a location of the UE. This information may be in the form of a geo-location of the UE or a zone ID for a zone in which the UE is located. This information may be received from, for example, a base station of the wireless communication system.

The method 1000 further includes calculating 1010 a distance between the UE and the peer UE based on the location of the UE and the location of the peer UE.

The method 1000 further includes determining 1012 whether an SL pathloss based calculation is to be used to calculate a transmit power of the PSFCH according to the SL session with the peer UE, wherein the SL pathloss based calculation is configured to be used depending on a distance between the UE and the peer UE, and wherein the SL pathloss based calculation is determined to be used based on the calculated distance. The determination may be made by comparing the calculated distance to a threshold for determining whether or not to use the SL pathloss based calculation. In some cases, this threshold may be at 1,000 meters.

The method 1000 further includes sending 1014, to the peer UE, an SL pathloss based calculation indication indicating whether the SL pathloss based calculation is to be used to calculate the transmit power of the PSFCH. This indication may be a single bit. This indication may enable the peer UE to perform power control calculations for PSFCH on SL according to the determination performed at the UE of whether to use an SL pathloss based calculation. The SL pathloss based calculation indication may be indicated to the peer UE in SCI stage 2.

Figure 11:
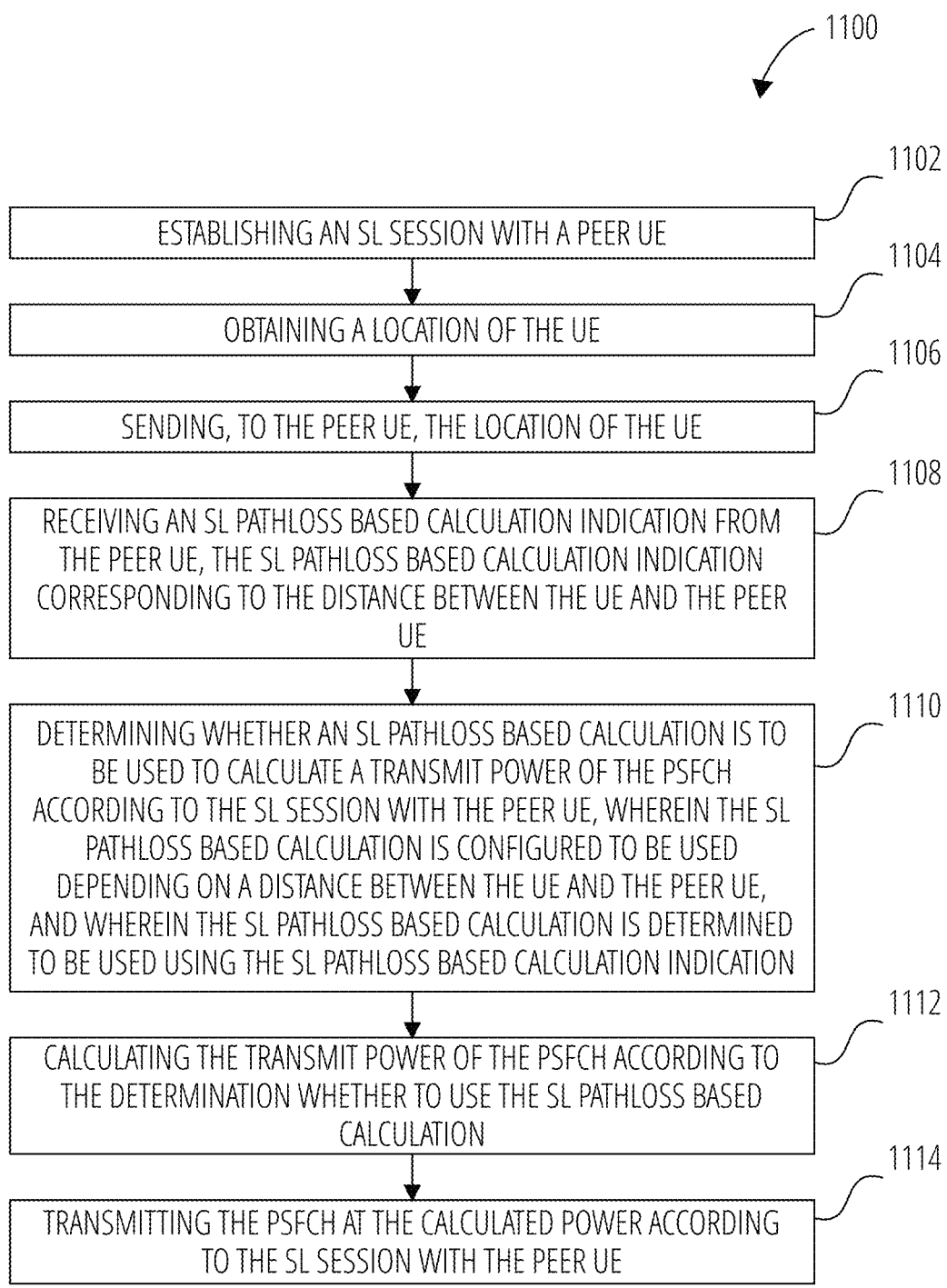
FIG. 11 illustrates a method of a UE for SL communication, according to an embodiment.

FIG. 11 illustrates a method 1100 of a UE for SL communication, according to an embodiment. A UE may perform the method of FIG. 11 to determine a transmit power for a PSFCH to be sent by the UE on an SL communication to a peer UE.

The method 1100 includes establishing 1102 an SL session with a peer UE.

The method 1100 further includes obtaining 1104 a location of the UE. This information may be in the form of a geo-location of the UE or a zone ID for a zone in which the UE is located. This information may be received from, for example, a base station of the wireless communication system.

The method 1100 further includes sending 1106, to the peer UE, the location of the UE. In some embodiments, the UE sends a geo-location to the peer UE in a PSSCH. In other embodiments, the UE sends a zone ID for a zone in which the UE is located in one of an SCI stage 2 message, a MAC CE, or an RRC message.

The method 1100 further includes receiving 1108 an SL pathloss based calculation indication from the peer UE, the SL pathloss based calculation indication corresponding to the distance between the UE and the peer UE. This indication may be a single bit. This indication may enable the UE to perform power control calculations for PSFCH on SL according to a determination performed at the peer UE of whether to use an SL pathloss based calculation. The SL pathloss based calculation indication may be indicated to the UE in SCI stage 2.

The method 1100 further includes determining 1110 whether an SL pathloss based calculation is to be used to calculate a transmit power of the PSFCH according to the SL session with the peer UE, wherein the SL pathloss based calculation is configured to be used depending on a distance between the UE and the peer UE, and wherein the SL pathloss based calculation is determined to be used using the SL pathloss based calculation indication.

The method 1100 further includes calculating 1112 the transmit power of the PSFCH according to the determination whether to use the SL pathloss based calculation. As a non-limiting example, if the determination was made to use the SL pathloss based calculation, the transmit power of the PSFCH may be calculated using $P_{PSFCH}(i)=\min(P_{CMAX}, P_{MAX,CBR}, \min(P_{PSFCH,D}(i), P_{PSFCH,SL}(i)))$ (as that formula is detailed above, including the use of an sl-P0-PSFCH parameter for $P_{O,SL-PSFCH}$ and an sl-Alpha-PSFCH parameter for $\alpha_{SL-PSFCH}$). In the same non-limiting example, if the determination was made to not use the SL pathloss based calculation, the transmit power of the PSFCH may be calculated using (only) $P_{PSFCH,D}(i)=P_{O,D-PSFCH}+10\log_{10}(2^\mu)+\alpha_{D-PSFCH} \cdot PL_D$.

The method 1100 further includes transmitting 1114 the PSFCH at the calculated power according to the SL session with the peer UE.

Figure 12:
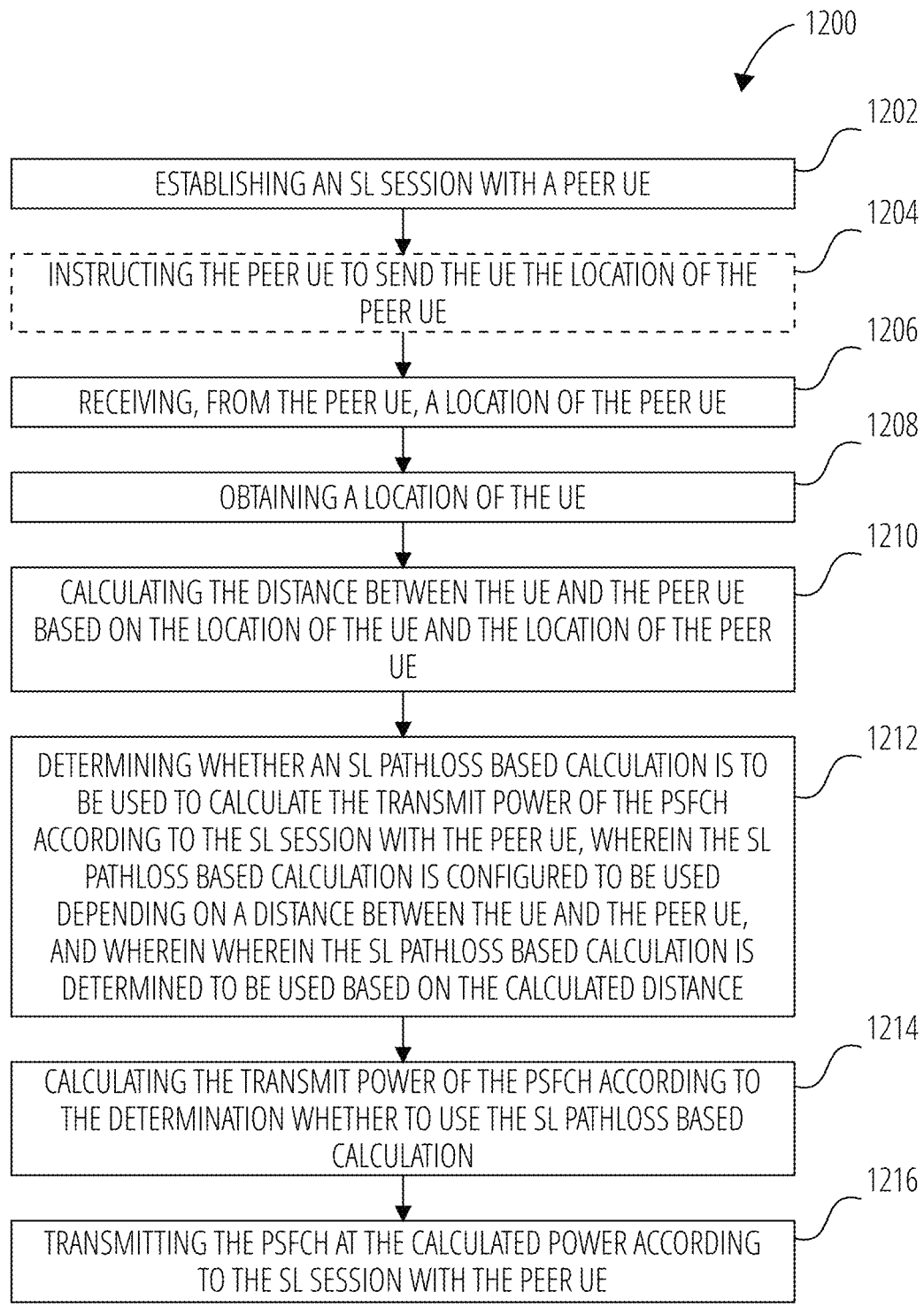
FIG. 12 illustrates a method of a UE for SL communication, according to an embodiment.

FIG. 12 illustrates a method 1200 of a UE for SL communication, according to an embodiment. A UE may perform the method of FIG. 8 to determine a transmit power for a PSFCH to be sent by the UE on an SL communication to a peer UE.

The method 1200 includes establishing 1202 an SL session with a peer UE.

The method 1200 further optionally includes instructing 1204 the peer UE to send the UE the location of the peer UE.

The method 1200 further includes receiving 1206, from the peer UE, a location of the peer UE. This reception may be in response to the instructing 1204 earlier sent by the UE. In other embodiments, the peer UE may instead send the UE its location without such explicit instruction from the UE. For example, the peer UE may send the UE its location automatically when the SL session is first established, and/or when the peer UE's location has changed since the last time it was informed to the UE. In some embodiments, the peer UE sends a geo-location to the UE in a PSSCH. In other embodiments, the peer UE sends a zone ID for a zone in which the peer UE is located in one of an SCI stage 2 message, a MAC CE, or an RRC message.

The method 1200 further includes obtaining 1208 a location of the UE. This information may be in the form of a geo-location of the UE or a zone ID for a zone in which the UE is located. This information may be received from, for example, a base station of the wireless communication system.

The method 1200 further includes calculating 1210 a distance between the UE and the peer UE based on the location of the UE and the location of the peer UE.

The method 1200 further includes determining 1212 whether an SL pathloss based calculation is to be used to calculate the transmit power of the PSFCH according to the SL session with the peer UE, wherein the SL pathloss based calculation is configured to be used depending on a distance between the UE and the peer UE, and wherein the SL pathloss based calculation is determined to be used based on the calculated distance. The determination may be made by comparing the calculated distance to a threshold for determining whether or not to use the SL pathloss based calculation. In some cases, this threshold may be at 1,000 meters.

The method 1200 further includes calculating 1214 the transmit power of the PSFCH according to the determination whether to use the SL pathloss based calculation. As a non-limiting example, if the determination was made to use the SL pathloss based calculation, the transmit power of the PSFCH may be calculated using $P_{PSFCH}(i)=\min(P_{CMAX}, P_{MAX,CBR}, \min(P_{PSFCH,D}(i), P_{PSFCH,SL}(i)))$ (as that formula is detailed above, including the use of an sl-P0-PSFCH parameter for $P_{O,SL-PSFCH}$ and an sl-Alpha-PSFCH parameter for $\alpha_{SL-PSFCH}$). In the same non-limiting example, if the determination was made to not use the SL pathloss based calculation, the transmit power of the PSFCH may be calculated using (only) $P_{PSFCH,D}(i)=P_{O,D-PSFCH}+10\log_{10}(2^\mu)+\alpha_{D-PSFCH} \cdot PL_D$.

The method 1200 further includes transmitting 1216 the PSFCH at the calculated power according to the SL session with the peer UE.

While discussion herein in FIG. 8 through FIG. 12 has discussed the methods therein by using PSFCH as a specific example, it is anticipated that the methods discussed in those figures could be similarly applied in the case of any channel for which SL-specific parameters are introduced relative to an unmodified case that uses (only) a DL-specific set of parameters.

In some instances, a plurality of PSFCH transmissions may be pending. According to a UE capability, it may be that the UE is capable of sending some (but not all) of these pending PSFCH transmissions in a single transmission occasion.

In some cases, the determination of which PSFCH(s) to transmit (or not) during the transmission occasion is determined based on a data priority rule that selects the PSFCH(s) of a higher data priority (e.g., selects PSFCH(s) corresponding to data of a higher priority relative to the data corresponding to the unselected PSFCH(s)) to send. Determinations on this basis may reflect the inherent relative priority for the data corresponding to the various PSFCHs.

Other rules based on other criteria are contemplated herein. For example, it may be that a distance rule that prioritizes a PSFCH under consideration if it corresponds to data (e.g., PSSCH and/or PSCCH messaging) from a peer UE for which there is a long distance between the UE and the peer UE. In such cases, an indication in SCI (e.g., SCI stage 2) may have informed the UE that the PSSCH and/or PSCCH triggering the PSFCH was sent according to a long distance arrangement. The prioritization of PSFCHs according to a long distance between the UE and the peer UE in this manner may reflect a desire to more reliably and quickly transmit such messages, in response to the understanding that such long distance SL transmissions are more resource intensive and less reliable than SL messages not according to a long distance.

As another example, a hybrid automatic repeat request (HARQ) acknowledgement (HARQ-ACK) rule prioritizes a PSFCH under consideration if it contains a HARQ-ACK message. The prioritization of PSFCHs according to whether they contain HARQ-ACK messages may reflect a desire to quickly respond to messaging to which a peer UE expects to receive the HARQ-ACK (for example, to minimize retransmissions by the peer UE and thus the attendant interference instances represented by such retransmissions).

In a first case, a UE may select PSFCH(s) for transmission using a distance rule. For example, the rule may select PSFCH(s) for transmission that correspond to a long distance between the UE and the peer UE.

In some of these cases, this distance rule may be a first of a series of applied rules (e.g., the distance rule is applied prior to the application of, e.g., a data priority rule and/or an ACK rule). For example, when the initial application of the distance rule results in the selection of more PSFCHs than can be sent during the transmission occasion due to the UE capability, additional rules may be used to further down-select from the selected PSFCH(s). For example, a data priority rule may be applied to down-select from the current set of PSFCH(s) such that a number of those PSFCH(s) of a higher data priority remain selected. Alternatively or additionally, a HARQ-ACK rule may be applied (before, in place of, or after the application of the data priority rule) to down-select from the current set of PSFCH(s) such that a number of those PSFCH(s) having a HARQ-ACK message remain selected. Such down-selection according to one or more rules may allow for the UE to narrow the PSFCH(s) for the current transmission occasion to be within the number allowed by the UE capability.

As another example, an initial application of the distance rule may select a total number of PSFCH(s) that is fewer than the UE capability. In this example, the additional rules may be used to make further selections from the remaining unselected PSFCH(s). For example, a data priority rule may be applied to select from the unselected PSFCH(s) such that a number of those PSFCH(s) of a higher data priority are also selected for transmission during the transmission occasion. Alternatively or additionally, a HARQ-ACK rule may be applied (before, in place of, or after the application of the data priority rule) to select from the unselected PSFCH(s) such that a number of those PSFCH(s) having a HARQ-ACK message are also selected for transmission during the transmission occasion.

In a second case, the UE may select PSFCH(s) for transmission using the priority rule. For example, the rule may select PSFCH(s) of a higher data priority for transmission.

In some of these cases, the priority rule may be a first of a series of applied rules (e.g., the priority rule is applied prior to the application of, e.g., a distance rule and/or an ACK rule). For example, when the initial application of the priority rule results in the selection of more PSFCHs than can be sent during the transmission occasion due to the UE capability, additional rules may be used to further down-select from the selected PSFCH(s). For example, a distance rule may be applied to down-select from the current set of PSFCH(s) such that a number of those PSFCH(s) corresponding to a long distance between the UE and the peer UE remain selected. Alternatively or additionally, a HARQ-ACK rule may be applied (before, in place of, or after the application of the data priority rule) to down-select from the current set of PSFCH(s) such that a number of those PSFCH(s) having a HARQ-ACK message remain selected. Such down-selection according to one or more rules may allow for the UE to narrow the PSFCH(s) for the current transmission occasion to be within the UE capability.

As another example, an initial application of the distance rule may select a total number of PSFCH(s) that is fewer than the UE capability. In this example, additional rules may be used to make further selections from the remaining unselected PSFCH(s). For example, a distance rule may be applied to select from the unselected PSFCH(s) such that a number of those PSFCH(s) corresponding to a long distance between the UE and the peer UE are also selected for transmission during the transmission occasion. Alternatively or additionally, a HARQ-ACK rule may be applied (before, in place of, or after the application of the data priority rule) to select from the unselected PSFCH(s) such that a number of those PSFCH(s) having a HARQ-ACK message are also selected for transmission during the transmission occasion.

In a third case, the UE may select PSFCH(s) for transmission using the HARQ-ACK rule. For example, the rule may select PSFCH(s) having a HARQ-ACK message for transmission.

In some of these cases, the HARQ-ACK rule may be a first of a series of applied rules (e.g., the HARQ-ACK rule is applied prior to the application of, e.g., a data priority rule or a distance rule). For example, when the initial application of the HARQ-ACK rule results in the selection of more PSFCHs than can be sent during the transmission occasion due to the UE capability, additional rules may be used to further down-select from the selected PSFCH(s). For example, a data priority rule may be applied to down-select from the current set of PSFCH(s) such that a number of those PSFCH(s) of a higher data priority remain selected. Alternatively or additionally, a distance rule may be applied (before, in place of, or after the application of the data priority rule) to down-select from the current set of PSFCH(s) such that a number of those PSFCH(s) corresponding to a long distance between the UE and the peer UE remain selected. Such down-selection according to one or more rules may allow for the UE to narrow the PSFCH(s) for the current transmission occasion to be within the UE capability.

As another example, an initial application of the HARQ-ACK rule selects a total number of PSFCH(s) that is fewer than the UE capability. In this example, additional rules may be used to make further selections from the remaining unselected PSFCH(s). For example, a data priority rule may be applied to select from the unselected PSFCH(s) such that a number of those PSFCH(s) of a higher data priority are also selected for transmission during the transmission occasion. Alternatively or additionally, a distance rule may be applied (before, in place of, or after the application of the data priority rule) to select from the unselected PSFCH(s) such that a number of those PSFCH(s) corresponding to a long distance between the UE and the peer UE are also selected for transmission during the transmission occasion.

Figure 13:
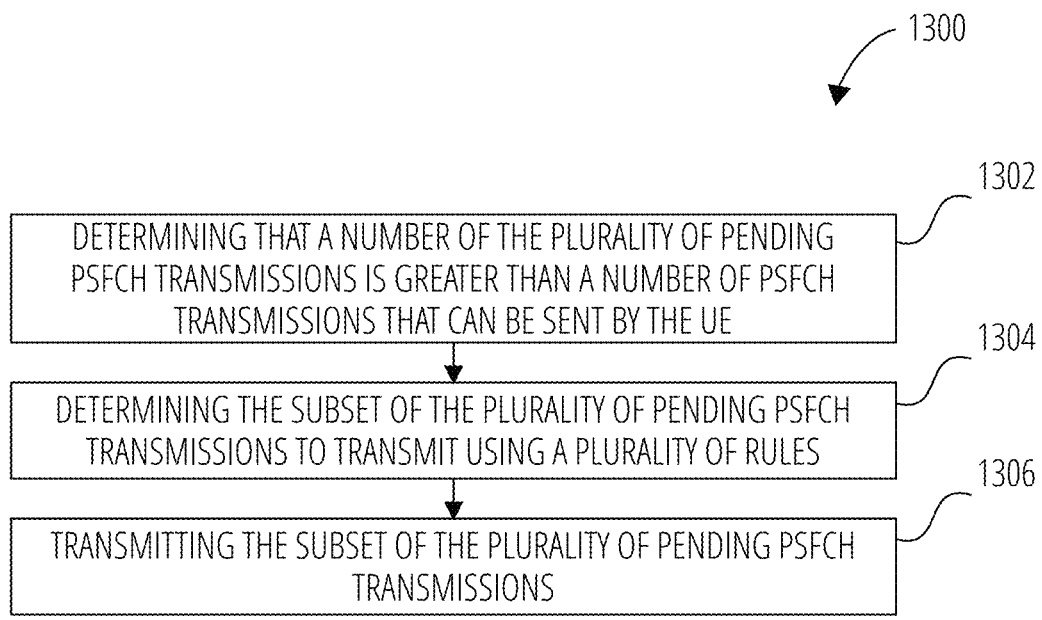
FIG. 13 illustrates a method of a UE for prioritizing a subset of a plurality of pending Physical Sidelink Feedback Channel (PSFCH) transmissions.

FIG. 13 illustrates a method 1300 of a UE for prioritizing a subset of a plurality of pending PSFCH transmissions. The method 1300 includes determining 1302 that a number of the plurality of pending PSFCH transmissions is greater than a number of PSFCH transmissions that can be sent by the UE.

The method 1300 further includes determining 1304 the subset of the plurality of pending PSFCH transmissions to transmit using a plurality of rules.

In some cases, the plurality of rules comprises a distance rule that prioritizes PSFCH transmissions of the pending PSFCH transmissions for inclusion in the subset that correspond to data from a peer UE for which there is a long distance between the UE and the peer UE. In some of these cases, the plurality of rules comprises the distance rule and a second rule, and the subset of the plurality of pending PSFCH transmissions to transmit is determined using the plurality of rules by applying the distance rule prior to applying the second rule. The second rule may be, for example, a data priority rule and/or a HARQ-ACK rule. It is further contemplated that a third rule could be subsequently applied, in the manner described above.

In some cases, the plurality of rules comprises a data priority rule that prioritizes PSFCH transmissions of the pending PSFCH transmissions for inclusion in the subset according to a priority of data to which the PSFCH transmissions correspond. In some of these cases, the plurality of rules comprises the data priority rule and a second rule, and the subset of the plurality of pending PSFCH transmissions to transmit is determined using the one or more priority rules by applying the data priority rule prior to applying the second rule. The second rule may be, for example, a distance rule and/or a HARQ-ACK rule. It is further contemplated that a third rule could be subsequently applied, in the manner described above.

In some cases, the plurality of rules comprises a HARQ-ACK rule that prioritizes PSFCH transmissions of the pending PSFCH transmissions for inclusion in the subset that contain HARQ-ACK messages. In some of these cases, the plurality of rules comprises the HARQ-ACK rule and a second rule, and the subset of the plurality of pending PSFCH transmissions to transmit is determined using the one or more priority rules by applying the HARQ-ACK rule prior to applying the second rule. The second rule may be, for example, a data priority rule and/or a distance rule. It is further contemplated that a third rule could be subsequently applied, in the manner described above.

The method 1300 further includes transmitting 1306 the subset of the plurality of pending PSFCH transmissions.

In some instances, a UE may be scheduled for both PSFCH transmission (in response to data received at the UE on SL) and PSFCH reception (in response to data sent by the UE on SL) in the same time resource. In these cases, the UE may need to determine whether to perform PSFCH transmission or PSFCH reception.

In some cases, the determination of whether to perform PSFCH transmission or PSFCH reception during the time resource is based on a data priority rule that selects according to a priority of the data corresponding to the PSFCH messages of the PSFCH transmission and the PSFCH reception. For example, in the case where a PSFCH message of the PSFCH transmission corresponds to data of a higher priority than a priority of data corresponding to each of the PSFCH messages of the PSFCH reception, the PSFCH transmission is prioritized. Correspondingly, in the case where a PSFCH message of the PSFCH reception corresponds to a data of a higher priority than a priority of data corresponding to each of the PSFCH messages of the PSFCH transmission, the PSFCH reception is prioritized.

In some cases, the determination of whether to perform PSFCH transmission or PSFCH reception during the time resource is based on a distance rule that selects according to distance between the UE and the peer UE(s) for which the PSFCH messages of the PSFCH transmission and the PSFCH reception correspond. For example, in the case where a PSFCH message of the PSFCH transmission is between the UE and a peer UE that is a long distance from the UE and each of the PSFCH messages of PSFCH reception are between a UE and one or more peer UE(s) that are not a long distance from the UE, the PSFCH transmission is prioritized. Correspondingly, in the case where a PSFCH message of the PSFCH reception is between the UE and a peer UE that is a long distance from the UE and each of the PSFCH messages of PSFCH transmission are between a UE and one or more peer UE(s) that are not a long distance from the UE, the PSFCH reception is prioritized. The prioritization of PSFCHs according to a long distance between the UE and the peer UE in this manner may reflect a desire to more reliably and quickly transmit such messages, in response to the understanding that such long distance SL transmissions are more resource intensive and less reliable than SL messages not according to a long distance.

In some cases, to determine whether to perform PSFCH transmission or PSFCH reception, a UE may first apply the data priority rule. However, the application of the data priority rule may not be deterministic in every case. For example, it may be that at least one PSFCH message of each of the PSFCH transmission and the PSFCH reception corresponds to data of the same priority (that is highest among all PSFCH messages of the PSFCH transmission and the PSFCH reception). In this case, the UE may proceed to secondarily apply a second rule in order to select between PSFCH transmission and PSFCH reception during the time slot. The second rule may be, for example, a distance rule as described.

In some cases, to determine whether to perform PSFCH transmission or PSFCH reception, a UE may first apply the distance rule. However, the application of the data priority rule may not be deterministic in every case. For example, it may be that at least one PSFCH message of each of the PSFCH transmission and the PSFCH reception corresponds to a peer UE that is a long distance from the UE. In another such case, it may be that no message of either of the PSFCH transmission and the PSFCH reception corresponds to a peer UE that is a long distance from the UE. In these cases, the UE may proceed to secondarily apply a second rule in order to select between PSFCH transmission and PSFCH reception during the time slot. The second rule may be, for example, a data priority rule as described.

Figure 14:
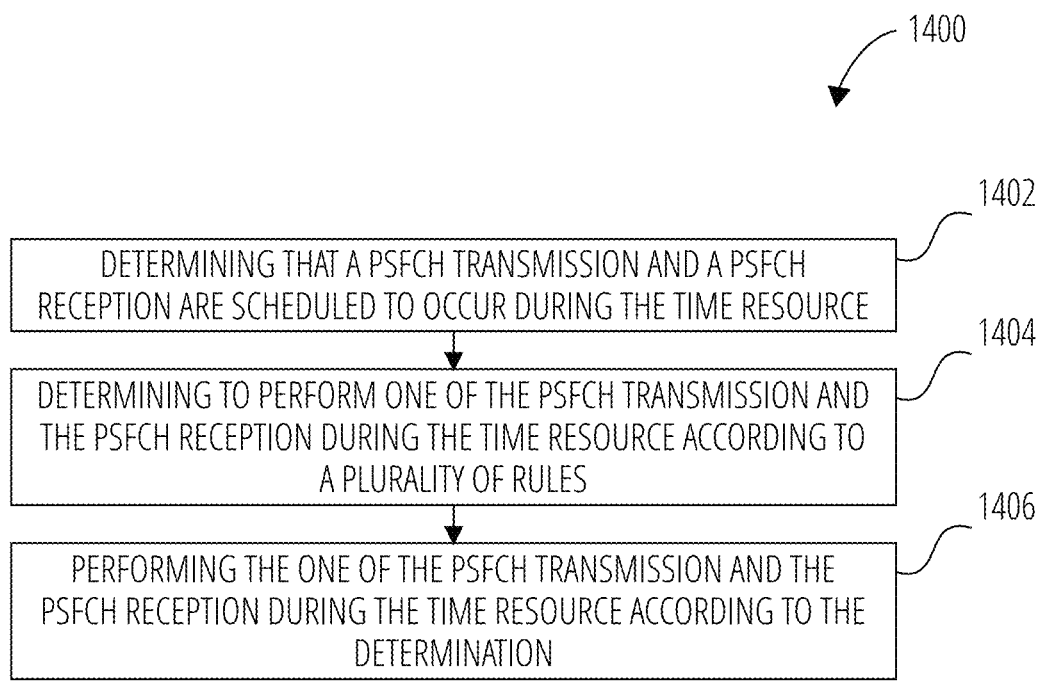
FIG. 14 illustrates a method of a UE for prioritizing between using a time resource for PSFCH transmission by the UE and PSFCH reception at the UE, according to an embodiment.

FIG. 14 illustrates a method 1400 of a UE for prioritizing between using a time resource for PSFCH transmission by the UE and PSFCH reception at the UE, according to an embodiment. The method 1400 includes determining 1402 that a PSFCH transmission and a PSFCH reception are scheduled to occur during the time resource.

The method 1400 further includes determining 1404 to perform one of the PSFCH transmission and the PSFCH reception during the time resource according to a plurality of rules.

In some cases, the plurality of rules comprises a distance rule that selects one of the PSFCH transmission and the PSFCH reception for performance when a PSFCH message of the one of the PSFCH transmission and the PSFCH reception are between the UE and a peer UE that is a long distance from the UE and all PSFCH messages of the other of the PSFCH transmission and the PSFCH reception are between the UE and a peer UE that is not a long distance from the UE. In some of these cases, the plurality of rules comprises the distance rule and a second rule that is used to select one of the PSFCH transmission and the PSFCH reception for performance when PFSCH messages of the PSFCH transmission and PFSCH messages of the PSFCH reception are all between the UE and a peer UE that is not a long distance from the UE or when each of 1) the PFSCH messages of the PSFCH transmission and 2) the PFSCH messages of the PSFCH reception comprises at least one PFSCH message that is between the UE and a peer UE that is a long distance from the UE. The second rule may be, e.g., a data priority rule as described above.

In some cases, the plurality of rules comprises a data priority rule that selects one of the PSFCH transmission and the PSFCH reception for performance when data corresponding to a PSFCH message of the one of the PSFCH transmission and the PSFCH reception has a higher priority than data corresponding to each of the PSFCH messages of the other of the PSFCH transmission and the PSFCH reception. In some of these cases, the plurality of rules comprises the data priority rule and a second rule that is used to select one of the PSFCH transmission and the PSFCH reception for performance when a PFSCH message of the PSFCH transmission and a PFSCH message of the PSFCH reception share a priority that is the highest priority among all the PFSCH messages of the PSFCH transmission and the PSFCH messages of the PSFCH reception. The second rule may be, for example, a distance rule as described above.

The method 1400 further includes performing 1406 the one of the PSFCH transmission and the PSFCH reception during the time resource according to the determination.

Figure 15:
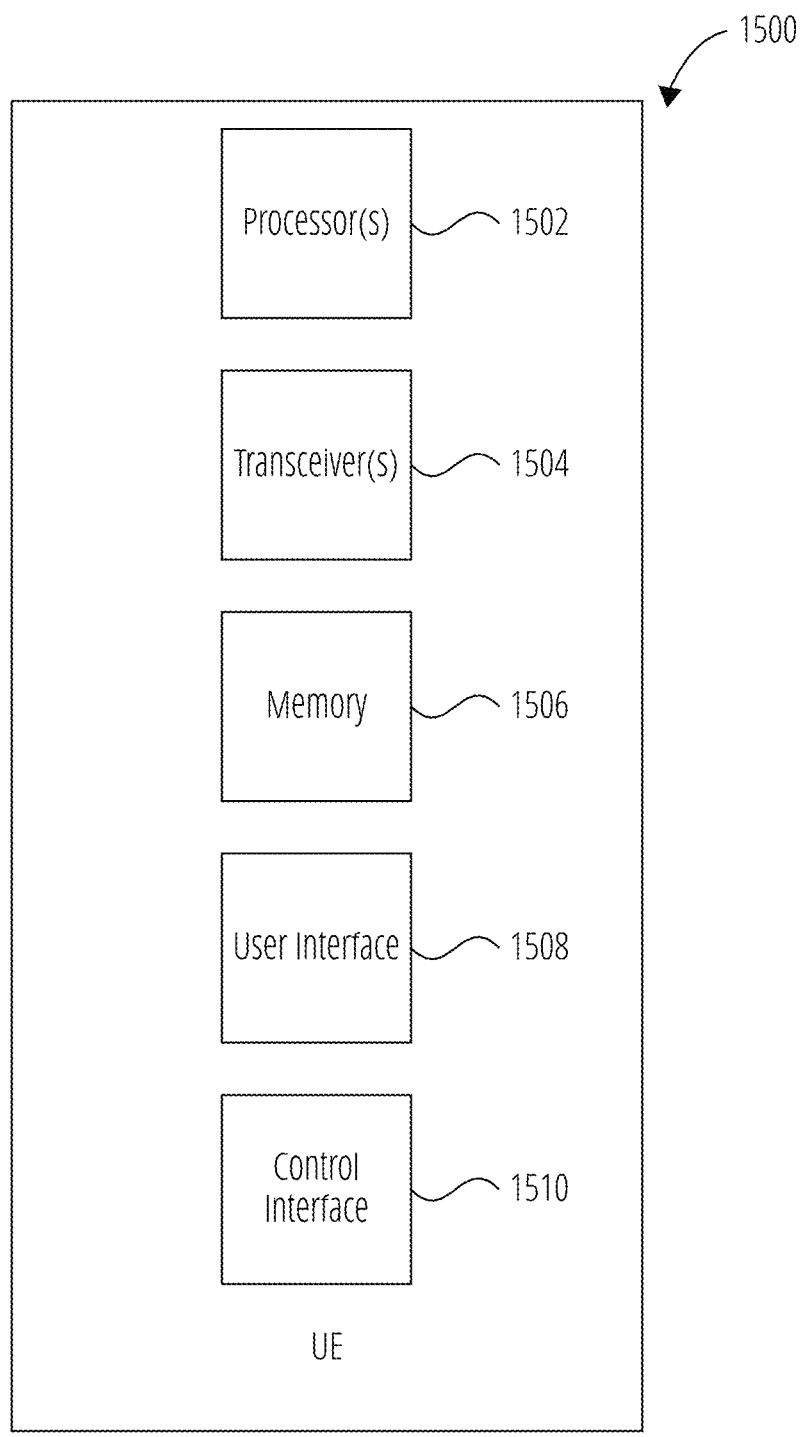
FIG. 15 illustrates a UE in accordance with one embodiment.

FIG. 15 is a block diagram of an example UE 1500 configurable according to various embodiments of the present disclosure, including by execution of instructions on a computer-readable medium that correspond to any of the example methods and/or procedures described herein. The UE 1500 comprises one or more processor 1502, transceiver 1504, memory 1506, user interface 1508, and control interface 1510.

The one or more processor 1502 may include, for example, an application processor, an audio digital signal processor, a central processing unit, and/or one or more baseband processors. Each of the one or more processor 1502 may include internal memory and/or may include interface(s) to communication with external memory (including the memory 1506). The internal or external memory can store software code, programs, and/or instructions for execution by the one or more processor 1502 to configure and/or facilitate the UE 1500 to perform various operations, including operations described herein. For example, execution of the instructions can configure the UE 1500 to communicate using one or more wired or wireless communication protocols, including one or more wireless communication protocols standardized by 3GPP such as those commonly known as 5G/NR, LTE, LTE-A, UMTS, HSPA, GSM, GPRS, EDGE, etc., or any other current or future protocols that can be utilized in conjunction with the one or more transceiver 1504, user interface 1508, and/or control interface 1510. As another example, the one or more processor 1502 may execute program code stored in the memory 1506 or other memory that corresponds to MAC, RLC, PDCP, and RRC layer protocols standardized by 3GPP (e.g., for NR and/or LTE). As a further example, the processor 1502 may execute program code stored in the memory 1506 or other memory that, together with the one or more transceiver 1504, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA).

The memory 1506 may comprise memory area for the one or more processor 1502 to store variables used in protocols, configuration, control, and other functions of the UE 1500, including operations corresponding to, or comprising, any of the example methods and/or procedures described herein. Moreover, the memory 1506 may comprise non-volatile memory (e.g., flash memory), volatile memory (e.g., static or dynamic RAM), or a combination thereof. Furthermore, the memory 1506 may interface with a memory slot by which removable memory cards in one or more formats (e.g., SD Card, Memory Stick, Compact Flash, etc.) can be inserted and removed.

The one or more transceiver 1504 may include radio-frequency transmitter and/or receiver circuitry that facilitates the UE 1500 to communicate with other equipment supporting like wireless communication standards and/or protocols. For example, the one or more transceiver 1504 may include switches, mixer circuitry, amplifier circuitry, filter circuitry, and synthesizer circuitry. Such RF circuitry may include a receive signal path with circuitry to down-convert RF signals received from a front-end module (FEM) and provide baseband signals to a baseband processor of the one or more processor 1502. The RF circuitry may also include a transmit signal path which may include circuitry to up-convert baseband signals provided by a baseband processor and provide RF output signals to the FEM for transmission. The FEM may include a receive signal path that may include circuitry configured to operate on RF signals received from one or more antennas, amplify the received signals and provide the amplified versions of the received signals to the RF circuitry for further processing. The FEM may also include a transmit signal path that may include circuitry configured to amplify signals for transmission provided by the RF circuitry for transmission by one or more antennas. In various embodiments, the amplification through the transmit or receive signal paths may be done solely in the RF circuitry, solely in the FEM, or in both the RF circuitry and the FEM circuitry. In some embodiments, the FEM circuitry may include a TX/RX switch to switch between transmit mode and receive mode operation.

In some exemplary embodiments, the one or more transceiver 1504 includes a transmitter and a receiver that enable UE 1500 to communicate with various 5G/NR networks according to various protocols and/or methods proposed for standardization by 3 GPP and/or other standards bodies. For example, such functionality can operate cooperatively with the one or more processor 1502 to implement a PHY layer based on OFDM, OFDMA, and/or SC-FDMA technologies, such as described herein with respect to other figures.

The user interface 1508 may take various forms depending on particular embodiments, or can be absent from the UE 1500. In some embodiments, the user interface 1508 includes a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 1500 may comprise a tablet computing device including a larger touchscreen display. In such embodiments, one or more of the mechanical features of the user interface 1508 may be replaced by comparable or functionally equivalent virtual user interface features (e.g., virtual keypad, virtual buttons, etc.) implemented using the touchscreen display, as familiar to persons of ordinary skill in the art. In other embodiments, the UE 1500 may be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many example embodiments of the UE 1500 having a touch screen display are capable of receiving user inputs, such as inputs related to exemplary methods and/or procedures described herein or otherwise known to persons of ordinary skill in the art.

In some exemplary embodiments of the present disclosure, the UE 1500 may include an orientation sensor, which can be used in various ways by features and functions of the UE 1500. For example, the UE 1500 can use outputs of the orientation sensor to determine when a user has changed the physical orientation of the UE 1500's touch screen display. An indication signal from the orientation sensor can be available to any application program executing on the UE 1500, such that an application program can change the orientation of a screen display (e.g., from portrait to landscape) automatically when the indication signal indicates an approximate 90-degree change in physical orientation of the device. In this manner, the application program can maintain the screen display in a manner that is readable by the user, regardless of the physical orientation of the device. In addition, the output of the orientation sensor can be used in conjunction with various exemplary embodiments of the present disclosure.

The control interface 1510 may take various forms depending on particular embodiments. For example, the control interface 1510 may include an RS-232 interface, an RS-485 interface, a USB interface, an HDMI interface, a Bluetooth interface, an IEEE ("Firewire") interface, an I²C interface, a PCMCIA interface, or the like. In some exemplary embodiments of the present disclosure, control interface 1260 can comprise an IEEE 802.3 Ethernet interface such as described above. In some embodiments of the present disclosure, the control interface 1510 may include analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the UE 1500 may include more functionality than is shown in FIG. 15 including, for example, a video and/or still-image camera, microphone, media player and/or recorder, etc. Moreover, the one or more transceiver 1504 may include circuitry for communication using additional radio-frequency communication standards including Bluetooth, GPS, and/or others. Moreover, the one or more processor 1502 may execute software code stored in the memory 1506 to control such additional functionality. For example, directional velocity and/or position estimates output from a GPS receiver can be available to any application program executing on the UE 1500, including various exemplary methods and/or computer-readable media according to various exemplary embodiments of the present disclosure.

Figure 16:
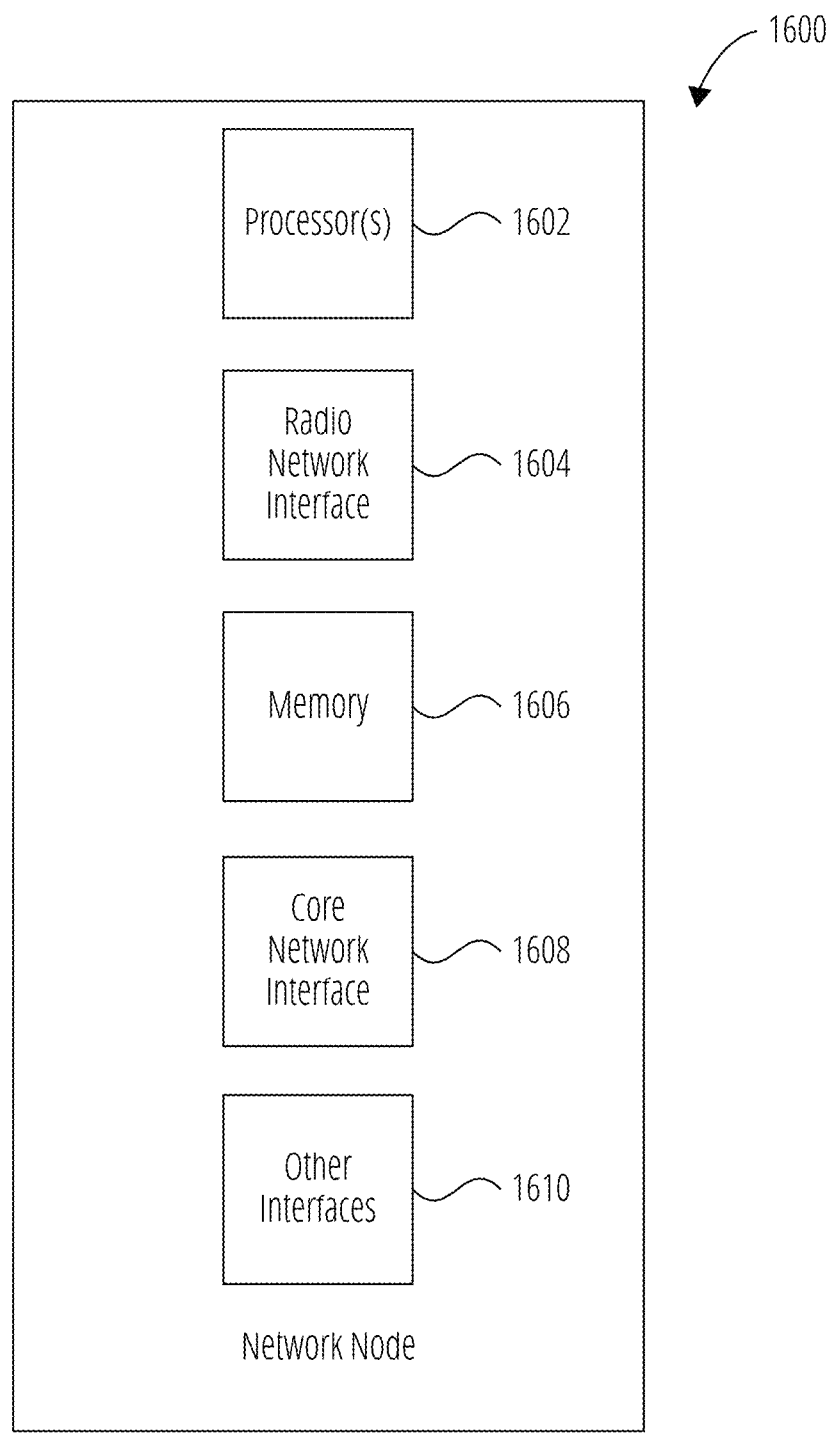
FIG. 16 illustrates a network node in accordance with one embodiment.

FIG. 16 is a block diagram of an example network node 1600 configurable according to various embodiments of the present disclosure, including by execution of instructions on a computer-readable medium that correspond to any of the example methods and/or procedures described herein.

The network node 1600 includes a one or more processor 1602, a radio network interface 1604, a memory 1606, a core network interface 1608, and other interfaces 1610. The network node 1600 may comprise, for example, a base station, eNB, gNB, access node, or component thereof.

The one or more processor 1602 may include any type of processor or processing circuitry and may be configured to perform any of the methods or procedures disclosed herein. The memory 1606 may store software code, programs, and/or instructions executed by the one or more processor 1602 to configure the network node 1600 to perform various operations, including operations described herein. For example, execution of such stored instructions can configure the network node 1600 to communicate with one or more other devices using protocols according to various embodiments of the present disclosure, including one or more methods and/or procedures discussed above. Furthermore, execution of such stored instructions can also configure and/or facilitate the network node 1600 to communicate with one or more other devices using other protocols or protocol layers, such as one or more of the PHY, MAC, RLC, PDCP, and RRC layer protocols standardized by 3GPP for LTE, LTE-A, and/or NR, or any other higher-layer protocols utilized in conjunction with the radio network interface 1604 and the core network interface 1608. By way of example and without limitation, the core network interface 1608 comprise an S1 interface and the radio network interface 1604 may comprise a Uu interface, as standardized by 3GPP. The memory 1606 may also store variables used in protocols, configuration, control, and other functions of the network node 1600. As such, the memory 1606 may comprise non-volatile memory (e.g., flash memory, hard disk, etc.), volatile memory (e.g., static or dynamic RAM), network-based (e.g., "cloud") storage, or a combination thereof.

The radio network interface 1604 may include transmitters, receivers, signal processors, ASICs, antennas, beamforming units, and other circuitry that enables network node 1600 to communicate with other equipment such as, in some embodiments, a plurality of compatible user equipment (UE). In some embodiments, the network node 1600 may include various protocols or protocol layers, such as the PHY, MAC, RLC, PDCP, and RRC layer protocols standardized by 3GPP for LTE, LTE-A, and/or 5G/NR. According to further embodiments of the present disclosure, the radio network interface 1604 may include a PHY layer based on OFDM, OFDMA, and/or SC-FDMA technologies. In some embodiments, the functionality of such a PHY layer can be provided cooperatively by the radio network interface 1604 and the one or more processor 1602.

The core network interface 1608 may include transmitters, receivers, and other circuitry that enables the network node 1600 to communicate with other equipment in a core network such as, in some embodiments, circuit-switched (CS) and/or packet-switched Core (PS) networks. In some embodiments, the core network interface 1608 may include the S1 interface standardized by 3GPP. In some embodiments, the core network interface 1608 may include one or more interfaces to one or more SGWs, MMEs, SGSNs, GGSNs, and other physical devices that comprise functionality found in GERAN, UTRAN, E-UTRAN, and CDMA2000 core networks that are known to persons of ordinary skill in the art. In some embodiments, these one or more interfaces may be multiplexed together on a single physical interface. In some embodiments, lower layers of the core network interface 1608 may include one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

The other interfaces 1610 may include transmitters, receivers, and other circuitry that enables the network node 1600 to communicate with external networks, computers, databases, and the like for purposes of operations, administration, and maintenance of the network node 1600 or other network equipment operably connected thereto.

Example System Architecture

In certain embodiments, 5G System architecture supports data connectivity and services enabling deployments to use techniques such as Network Function Virtualization and Software Defined Networking. The 5G System architecture may leverage service-based interactions between Control Plane Network Functions. Separating User Plane functions from the Control Plane functions allows independent scalability, evolution, and flexible deployments (e.g., centralized location or distributed (remote) location). Modularized function design allows for function re-use and may enable flexible and efficient network slicing. A Network Function and its Network Function Services may interact with another NF and its Network Function Services directly or indirectly via a Service Communication Proxy. Another intermediate function may help route Control Plane messages. The architecture minimizes dependencies between the AN and the CN. The architecture may include a converged core network with a common AN-CN interface that integrates different Access Types (e.g., 3GPP access and non-3GPP access). The architecture may also support a unified authentication framework, stateless NFs where the compute resource is decoupled from the storage resource, capability exposure, concurrent access to local and centralized services (to support low latency services and access to local data networks, User Plane functions can be deployed close to the AN), and/or roaming with both Home routed traffic as well as Local breakout traffic in the visited PLMN.

The 5G architecture may be defined as service-based and the interaction between network functions may include a service-based representation, where network functions (e.g., AMF) within the Control Plane enable other authorized network functions to access their services. The service-based representation may also include point-to-point reference points. A reference point representation may also be used to show the interactions between the NF services in the network functions described by point-to-point reference point (e.g., N11) between any two network functions (e.g., AMF and SMF).

Figure 17:
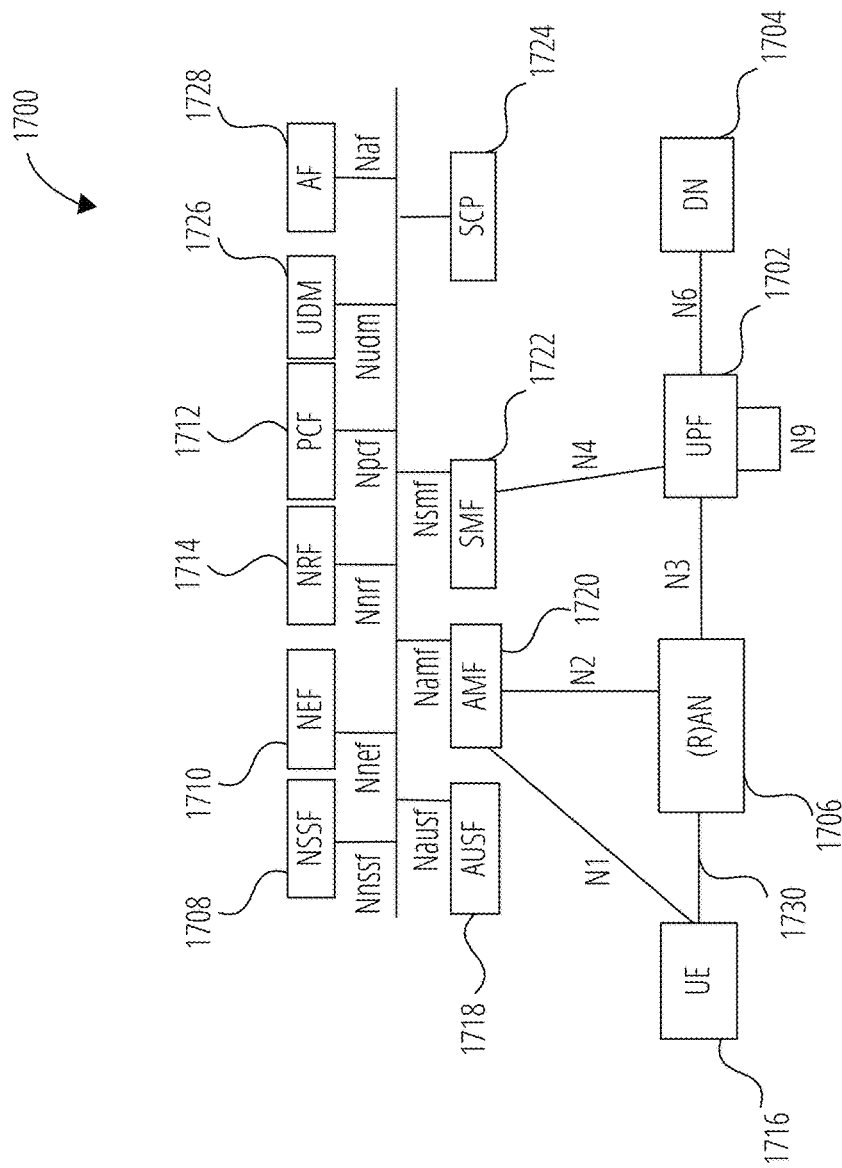
FIG. 17 illustrates an example service based architecture in accordance with certain embodiments.

FIG. 17 illustrates a service based architecture 1700 in 5GS according to one embodiment. As described in 3GPP TS 23.501, the service based architecture 1700 comprises NFs such as an NSSF 1708, a NEF 1710, an NRF 1714, a PCF 1712, a UDM 1726, an AUSF 1718, an AMF 1720, an SMF 1722, for communication with a UE 1716, a (R)AN 1706, a UPF 1702, and a DN 1704. The NFs and NF services can communicate directly, referred to as Direct Communication, or indirectly via a SCP 1724, referred to as Indirect Communication. FIG. 17 also shows corresponding service-based interfaces including Nutm, Naf, Nudm, Npcf, Nsmf, Nnrf, Namf, Nnef, Nnssf, and Nausf, as well as reference points N1, N2, N3, N4, and N6. A few example functions provided by the NFs shown in FIG. 17 are described below.

The NSSF 1708 supports functionality such as: selecting the set of Network Slice instances serving the UE; determining the Allowed NSSAI and, if needed, mapping to the Subscribed S-NSSAIs; determining the Configured NSSAI and, if needed, the mapping to the Subscribed S-NSSAIs; and/or determining the AMF Set to be used to serve the UE, or, based on configuration, a list of candidate AMF(s), possibly by querying the NRF.

The NEF 1710 supports exposure of capabilities and events. NF capabilities and events may be securely exposed by the NEF 1710 (e.g., for 3rd party, Application Functions, and/or Edge Computing). The NEF 1710 may store/retrieve information as structured data using a standardized interface (Nudr) to a UDR. The NEF 1710 may also secure provision of information from an external application to 3GPP network and may provide for the Application Functions to securely provide information to the 3GPP network (e.g., expected UE behavior, 5GLAN group information, and service specific information), wherein the NEF 1710 may authenticate and authorize and assist in throttling the Application Functions. The NEF 1710 may provide translation of internal-external information by translating between information exchanged with the AF and information exchanged with the internal network function. For example, the NEF 1710 translates between an AF-Service-Identifier and internal 5G Core information such as DNN and S-NSSAI. The NEF 1710 may handle masking of network and user sensitive information to external AF's according to the network policy. The NEF 1710 may receive information from other network functions (based on exposed capabilities of other network functions), and stores the received information as structured data using a standardized interface to a UDR. The stored information can be accessed and re-exposed by the NEF 1710 to other network functions and Application Functions, and used for other purposes such as analytics. For external exposure of services related to specific UE(s), the NEF 1710 may reside in the HPLMN. Depending on operator agreements, the NEF 1710 in the HPLMN may have interface(s) with NF(s) in the VPLMN. When a UE is capable of switching between EPC and 5GC, an SCEF+NEF may be used for service exposure.

The NRF 1714 supports service discovery function by receiving an NF Discovery Request from an NF instance or SCP and providing the information of the discovered NF instances to the NF instance or SCP. The NRF 1714 may also support P-CSCF discovery (specialized case of AF discovery by SMF), maintains the NF profile of available NF instances and their supported services, and/or notify about newly registered/updated/deregistered NF instances along with its NF services to the subscribed NF service consumer or SCP. In the context of Network Slicing, based on network implementation, multiple NRFs can be deployed at different levels such as a PLMN level (the NRF is configured with information for the whole PLMN), a shared-slice level (the NRF is configured with information belonging to a set of Network Slices), and/or a slice-specific level (the NRF is configured with information belonging to an S-NSSAI). In the context of roaming, multiple NRFs may be deployed in the different networks, wherein the NRF(s) in the Visited PLMN (known as the vNRF) are configured with information for the visited PLMN, and wherein the NRF(s) in the Home PLMN (known as the hNRF) are configured with information for the home PLMN, referenced by the vNRF via an N27 interface.

The PCF 1712 supports a unified policy framework to govern network behavior. The PCF 1712 provides policy rules to Control Plane function(s) to enforce them. The PCF 1712 accesses subscription information relevant for policy decisions in a Unified Data Repository (UDR). The PCF 1712 may access the UDR located in the same PLMN as the PCF.

The UDM 1726 supports generation of 3GPP AKA Authentication Credentials, User Identification Handling (e.g., storage and management of SUPI for each subscriber in the 5G system), de-concealment of a privacy-protected subscription identifier (SUCI), access authorization based on subscription data (e.g., roaming restrictions), UE's Serving NF Registration Management (e.g., storing serving AMF for UE, storing serving SMF for UE's PDU Session), service/session continuity (e.g., by keeping SMF/DNN assignment of ongoing sessions, MT-SMS delivery, Lawful Intercept Functionality (especially in outbound roaming cases where a UDM is the only point of contact for LI), subscription management, SMS management, 5GLAN group management handling, and/or external parameter provisioning (Expected UE Behavior parameters or Network Configuration parameters). To provide such functionality, the UDM 1726 uses subscription data (including authentication data) that may be stored in a UDR, in which case a UDM implements the application logic and may not require an internal user data storage and several different UDMs may serve the same user in different transactions. The UDM 1726 may be located in the HPLMN of the subscribers it serves, and may access the information of the UDR located in the same PLMN.

The AUSF 1718 supports authentication for 3GPP access and untrusted non-3GPP access. The AUSF 1718 may also provide support for Network Slice-Specific Authentication and Authorization.

The AMF 1720 supports termination of RAN CP interface (N2), termination of NAS (N1) for NAS ciphering and integrity protection, registration management, connection management, reachability management, Mobility Management, lawful intercept (for AMF events and interface to LI System), transport for SM messages between UE and SMF, transparent proxy for routing SM messages, Access Authentication, Access Authorization, transport for SMS messages between UE and SMSF, SEAF, Location Services management for regulatory services, transport for Location Services messages between UE and LMF as well as between RAN and LMF, EPS Bearer ID allocation for interworking with EPS, UE mobility event notification, Control Plane CIoT 5GS Optimization, User Plane CIoT 5GS Optimization, provisioning of external parameters (Expected UE Behavior parameters or Network Configuration parameters), and/or Network Slice-Specific Authentication and Authorization. Some or all of the AMF functionalities may be supported in a single instance of the AMF 1720. Regardless of the number of Network functions, in certain embodiments there is only one NAS interface instance per access network between the UE and the CN, terminated at one of the Network functions that implements at least NAS security and Mobility Management. The AMF 1720 may also include policy related functionalities.

In addition to the functionalities described above, the AMF 1720 may include the following functionality to support non-3GPP access networks: support of N2 interface with N3IWF/TNGF, over which some information (e.g., 3GPP Cell Identification) and procedures (e.g., Handover related) defined over 3GPP access may not apply, and non-3GPP access specific information may be applied that do not apply to 3GPP accesses; support of NAS signaling with a UE over N3IWF/TNGF, wherein some procedures supported by NAS signaling over 3GPP access may be not applicable to untrusted non-3GPP (e.g., Paging) access; support of authentication of UEs connected over N3IWF/TNGF; management of mobility, authentication, and separate security context state(s) of a UE connected via a non-3GPP access or connected via a 3GPP access and a non-3GPP access simultaneously; support a coordinated RM management context valid over a 3GPP access and a Non 3GPP access; and/or support dedicated CM management contexts for the UE for connectivity over non-3GPP access. Not all of the above functionalities may be required to be supported in an instance of a Network Slice.

The SMF 1722 supports Session Management (e.g., Session Establishment, modify and release, including tunnel maintain between UPF and AN node), UE IP address allocation & management (including optional Authorization) wherein the UE IP address may be received from a UPF or from an external data network, DHCPv4 (server and client) and DHCPv6 (server and client) functions, functionality to respond to Address Resolution Protocol requests and/or IPv6 Neighbor Solicitation requests based on local cache information for the Ethernet PDUs (e.g., the SMF responds to the ARP and/or the IPv6 Neighbor Solicitation Request by providing the MAC address corresponding to the IP address sent in the request), selection and control of User Plane functions including controlling the UPF to proxy ARP or IPv6 Neighbor Discovery or to forward all ARP/IPv6 Neighbor Solicitation traffic to the SMF for Ethernet PDU Sessions, traffic steering configuration at the UPF to route traffic to proper destinations, 5G VN group management (e.g., maintain the topology of the involved PSA UPFs, establish and release the N19 tunnels between PSA UPFs, configure traffic forwarding at UPF to apply local switching, and/or N6-based forwarding or N19-based forwarding), termination of interfaces towards Policy control functions, lawful intercept (for SM events and interface to LI System), charging data collection and support of charging interfaces, control and coordination of charging data collection at the UPF, termination of SM parts of NAS messages, Downlink Data Notification, Initiator of AN specific SM information sent via AMF over N2 to AN, determination of SSC mode of a session, Control Plane CIoT 5GS Optimization, header compression, acting as I-SMF in deployments where I-SMF can be inserted/removed/relocated, provisioning of external parameters (Expected UE Behavior parameters or Network Configuration parameters), P-CSCF discovery for IMS services, roaming functionality (e.g., handle local enforcement to apply QoS SLAs (VPLMN), charging data collection and charging interface (VPLMN), and/or lawful intercept (in VPLMN for SM events and interface to LI System), interaction with external DN for transport of signaling for PDU Session authentication/authorization by external DN, and/or instructing UPF and NG-RAN to perform redundant transmission on N3/N9 interfaces. Some or all of the SMF functionalities may be supported in a single instance of a SMF. However, in certain embodiments, not all of the functionalities are required to be supported in an instance of a Network Slice. In addition to the functionalities, the SMF 1722 may include policy related functionalities.

The SCP 1724 includes one or more of the following functionalities: Indirect Communication; Delegated Discovery; message forwarding and routing to destination NF/NF services; communication security (e.g., authorization of the NF Service Consumer to access the NF Service Producer's API), load balancing, monitoring, overload control, etc.; and/or optionally interact with the UDR, to resolve the UDM Group ID/UDR Group ID/AUSF Group ID/PCF Group ID/CHF Group ID/HSS Group ID based on UE identity (e.g., SUPI or IMPI/IMPU). Some or all of the SCP functionalities may be supported in a single instance of an SCP. In certain embodiments, the SCP 1724 may be deployed in a distributed manner and/or more than one SCP can be present in the communication path between NF Services. SCPs can be deployed at PLMN level, shared-slice level, and slice-specific level. It may be left to operator deployment to ensure that SCPs can communicate with relevant NRFs.

The UE 1716 may include a device with radio communication capabilities. For example, the UE 1716 may comprise a smartphone (e.g., handheld touchscreen mobile computing devices connectable to one or more cellular networks). The UE 1716 may also comprise any mobile or non-mobile computing device, such as Personal Data Assistants (PDAs), pagers, laptop computers, desktop computers, wireless handsets, or any computing device including a wireless communications interface. A UE may also be referred to as a client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. The UE 1716 may comprise an IoT UE, which can comprise a network access layer designed for low-power IoT applications utilizing short-lived UE connections. An IoT UE can utilize technologies (e.g., M2M, MTC, or mMTC technology) for exchanging data with an MTC server or device via a PLMN, other UEs using ProSe or D2D communications, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure). The IoT UEs may execute background applications (e.g., keep-alive messages, status updates, etc.) to facilitate the connections of the IoT network.

The UE 1716 may be configured to connect or communicatively couple with the (R)AN 1706 through a radio interface 1730, which may be a physical communication interface or layer configured to operate with cellular communication protocols such as a GSM protocol, a CDMA network protocol, a Push-to-Talk (PTT) protocol, a PTT over Cellular (POC) protocol, a UMTS protocol, a 3GPP LTE protocol, a 5G protocol, a NR protocol, and the like. For example, the UE 1716 and the (R)AN 1706 may use a Uu interface (e.g., an LTE-Uu interface) to exchange control plane data via a protocol stack comprising a PHY layer, an MAC layer, an RLC layer, a PDCP layer, and an RRC layer. A DL transmission may be from the (R)AN 1706 to the UE 1716 and a UL transmission may be from the UE 1716 to the (R)AN 1706. The UE 1716 may further use a sidelink to communicate directly with another UE (not shown) for D2D, P2P, and/or ProSe communication. For example, a ProSe interface may comprise one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The (R)AN 1706 can include one or more access nodes, which may be referred to as base stations (BSs), NodeBs, evolved NodeBs (eNBs), next Generation NodeBs (gNB), RAN nodes, controllers, transmission reception points (TRPs), and so forth, and can comprise ground stations (e.g., terrestrial access points) or satellite stations providing coverage within a geographic area (e.g., a cell). The (R)AN 1706 may include one or more RAN nodes for providing macrocells, picocells, femtocells, or other types of cells. A macrocell may cover a relatively large geographic area (e.g., several kilometers in radius) and may allow unrestricted access by UEs with service subscription. A picocell may cover a relatively small geographic area and may allow unrestricted access by UEs with service subscription. A femtocell may cover a relatively small geographic area (e.g., a home) and may allow restricted access by UEs having an association with the femtocell (e.g., UEs in a Closed Subscriber Group (CSG), UEs for users in the home, etc.).

Although not shown, multiple RAN nodes (such as the (R)AN 1706) may be used, wherein an Xn interface is defined between two or more nodes. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for the UE 1716 in a connected mode (e.g., CM-CONNECTED) including functionality to manage the UE mobility for connected mode between one or more (R)AN nodes. The mobility support may include context transfer from an old (source) serving (R)AN node to new (target) serving (R)AN node; and control of user plane tunnels between old (source) serving (R)AN node to new (target) serving (R)AN node.

The UPF 1702 may act as an anchor point for intra-RAT and inter-RAT mobility, an external PDU session point of interconnect to the DN 1704, and a branching point to support multi-homed PDU session. The UPF 1702 may also perform packet routing and forwarding, packet inspection, enforce user plane part of policy rules, lawfully intercept packets (UP collection); traffic usage reporting, perform QoS handling for user plane (e.g. packet filtering, gating, ULDL rate enforcement), perform Uplink Traffic verification (e.g., SDF to QoS flow mapping), transport level packet marking in the uplink and downlink, and downlink packet buffering and downlink data notification triggering. The UPF 1702 may include an uplink classifier to support routing traffic flows to a data network. The DN 1704 may represent various network operator services, Internet access, or third party services. The DN 1704 may include, for example, an application server.

Figure 18:
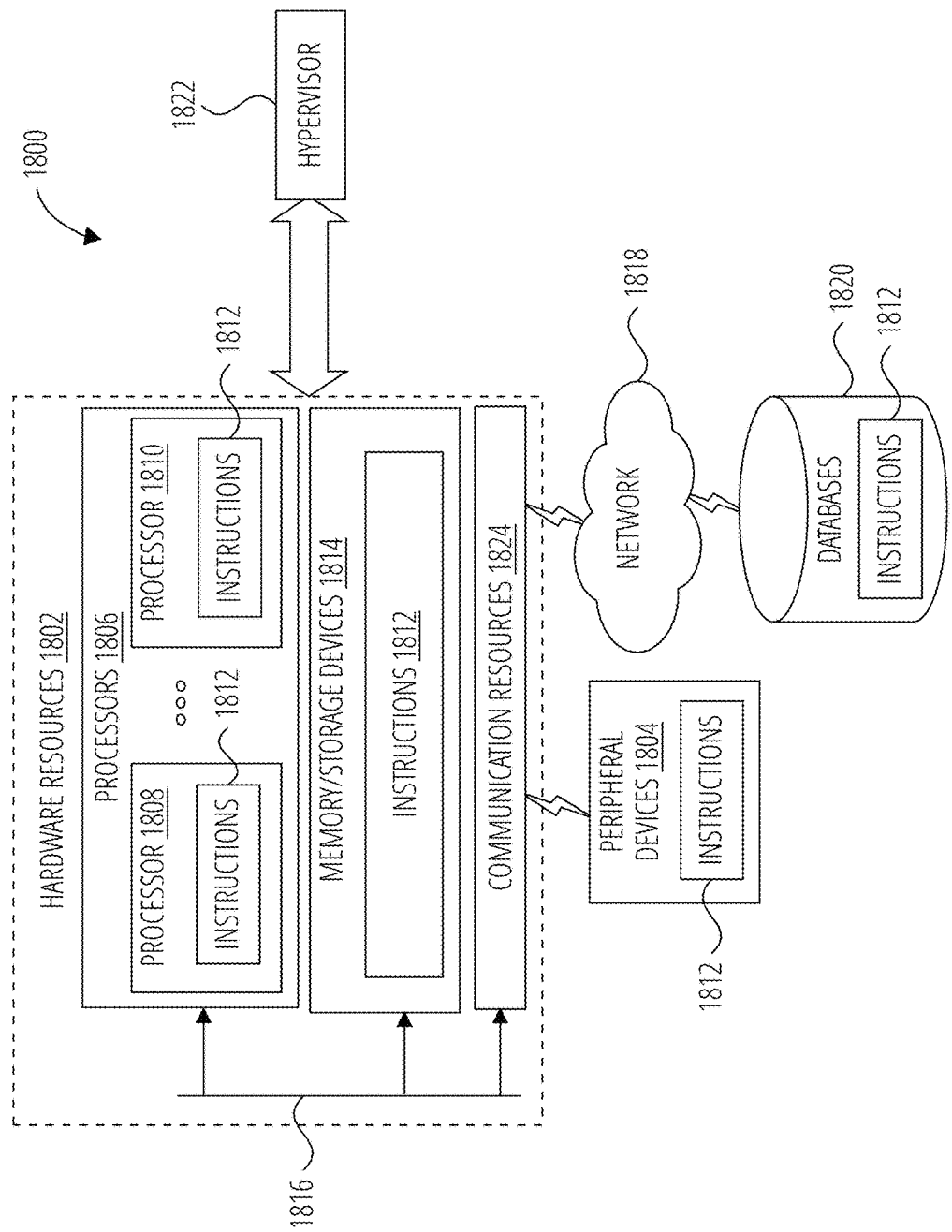
FIG. 18 illustrates components in accordance with one embodiment.

FIG. 18 is a block diagram illustrating components 1800, according to some example embodiments, able to read instructions from a machine-readable or computer-readable medium (e.g., a non-transitory machine-readable storage medium) and perform any one or more of the methodologies discussed herein. Specifically, FIG. 18 shows a diagrammatic representation of hardware resources 1802 including one or more processors 1806 (or processor cores), one or more memory/storage devices 1814, and one or more communication resources 1824, each of which may be communicatively coupled via a bus 1816. For embodiments where node virtualization (e.g., NFV) is utilized, a hypervisor 1822 may be executed to provide an execution environment for one or more network slices/sub-slices to utilize the hardware resources 1802.

The processors 1806 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1808 and a processor 1810.

The memory/storage devices 1814 may include main memory, disk storage, or any suitable combination thereof. The memory/storage devices 1814 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1824 may include interconnection or network interface components or other suitable devices to communicate with one or more peripheral devices 1804 or one or more databases 1820 via a network 1818. For example, the communication resources 1824 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1812 may comprise software, a program, an application, an applet, an app, or other executable code for causing at least any of the processors 1806 to perform any one or more of the methodologies discussed herein. The instructions 1812 may reside, completely or partially, within at least one of the processors 1806 (e.g., within the processor's cache memory), the memory/storage devices 1814, or any suitable combination thereof. Furthermore, any portion of the instructions 1812 may be transferred to the hardware resources 1802 from any combination of the peripheral devices 1804 or the databases 1820. Accordingly, the memory of the processors 1806, the memory/storage devices 1814, the peripheral devices 1804, and the databases 1820 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Example Section

The following examples pertain to further embodiments.

Example 1 is a method of a user equipment (UE) for sidelink (SL) communication, comprising: establishing an SL session with a peer UE; and selecting a parameter set to use to calculate a transmit power of one or more channels to be transmitted according to the SL session with the peer UE; wherein the parameter set is selected from a plurality of parameter sets that are each configured for use with the one or more channels according to a distance between the UE and the peer UE.

Example 2 is the method of Example 1, further comprising: calculating the transmit power of the one or more channels using the selected parameter set; and transmitting the one or more channels at the calculated power according to the SL session with the peer UE.

Example 3 is the method of any of Examples 1-2, wherein the parameter set is selected based on its association with a resource pool having resources used to transmit the one or more channels and that is configured for use with the one or more channels according to the distance between the UE and the peer UE.

Example 4 is the method of any of Examples 1-2, wherein the parameter set is selected based on a PC5 radio resource control (RRC) configuration between the UE and the peer UE that is made according to the distance between the UE and the peer UE.

Example 5 is the method of Example 1, further comprising: receiving, from the peer UE, a location of the peer UE; obtaining a location of the UE; and calculating the distance between the UE and the peer UE based on the location of the UE and the location of the peer UE; wherein the parameter set is selected based on the calculated distance.

Example 6 is the method of Example 5, further comprising instructing the peer UE to send the UE the location of the peer UE.

Example 7 is the method of Example 5, further comprising sending, to the peer UE, a parameter set indication indicating the selected parameter set.

Example 8 is the method of any of Examples 5-7, wherein the location of the peer UE is received in one of a PSSCH, an SL control information (SCI) message, a medium access control (MAC) control element (MAC CE), and a radio resource control (RRC) message.

Example 9 is the method of Example 1, further comprising: obtaining a location of the UE; sending, to the peer UE, the location of the UE; and receiving a parameter set indication from the peer UE, the parameter set indication corresponding to the distance between the UE and the peer UE; wherein the parameter set is selected using the parameter set indication.

Example 10 is the method of Example 9, wherein the location of the UE is sent in one of a PSSCH, an SL control information (SCI) message, a medium access control (MAC) control element (MAC CE), and a radio resource control (RRC) message.

Example 11 is the method of any of Examples 1-2, wherein the one or more channels comprise one or more of a physical SL shared channel (PSSCH) and a physical SL control channel (PSCCH).

Example 12 is the method of any of Examples 1-2, wherein the one or more channels comprise a physical SL broadcast channel (PSBCH).

Example 13 is a method of a user equipment (UE) for sidelink (SL) communication, comprising: establishing an SL session with a peer UE; and determining whether an SL pathloss based calculation is to be used to calculate a transmit power of one or more channels according to the SL session with the peer UE; wherein the SL pathloss based calculation is configured to be used depending on a distance between the UE and the peer UE.

Example 14 is the method of Example 13, further comprising: calculating the transmit power of the one or more channels according to the determination whether to use the SL pathloss based calculation; and transmitting the one or more channels at the calculated power according to the SL session with the peer UE.

Example 15 is the method of any of Examples 13-14, wherein the SL pathloss based calculation is determined to be used based on its association with a resource pool having resources used to transmit the one or more channels and that is configured for use with the one or more channels according to the distance between the UE and the peer UE.

Example 16 is the method of any of Examples 13-14, wherein the SL pathloss based calculation is determined to be used based on a PC5 radio resource control (RRC) configuration between the UE and the peer UE that is made according to the distance between the UE and the peer UE.

Example 17 is the method of any of Examples 13-14, wherein the SL pathloss base calculation is used along with a downlink pathloss calculation to calculate the transmit power of the one or more channels in response to a determination that the SL pathloss based calculation is to be used.

Example 18 is the method of Example 13, further comprising: receiving, from the peer UE, a location of the peer UE; obtaining a location of the UE; and calculating a distance between the UE and the peer UE based on the location of the UE and the location of the peer UE; wherein the SL pathloss based calculation is determined to be used based on the calculated distance.

Example 19 is the method of Example 18, further comprising sending, to the peer UE, an SL pathloss based calculation indication indicating whether the SL pathloss based calculation is to be used to calculate the transmit power of the one or more channels.

Example 20 is the method of Example 18, further comprising instructing the peer UE to send the UE the location of the peer UE.

Example 21 is the method of Example 13, further comprising: obtaining a location of the UE; sending, to the peer UE, the location of the UE; and receiving an SL pathloss based calculation indication from the peer UE, the SL pathloss based calculation indication corresponding to the distance between the UE and the peer UE; wherein the SL pathloss based calculation is determined to be used using the SL pathloss based calculation indication.

Example 22 is the method of any of Examples 13-14, wherein the one or more channels comprises a physical SL feedback channel (PSFCH).

Example 23 is a method of a user equipment (UE) for prioritizing a subset of a plurality of pending physical sidelink (SL) feedback channel (PSFCH) transmissions, comprising: determining that a number of the plurality of pending PSFCH transmissions is greater than a number of PSFCH transmissions that can be sent by the UE; determining the subset of the plurality of pending PSFCH transmissions to transmit using a plurality of rules; and transmitting the subset of the plurality of pending PSFCH transmissions.

Example 24 is the method of Example 23, wherein the plurality of rules comprises a distance rule that prioritizes PSFCH transmissions of the pending PSFCH transmissions for inclusion in the subset that correspond to data from a peer UE for which there is a long distance between the UE and the peer UE.

Example 25 is the method of Example 24, wherein the plurality of rules comprises the distance rule and a second rule; and wherein determining the subset of the plurality of pending PSFCH transmissions to transmit using the plurality of rules comprises applying the distance rule prior to applying the second rule.

Example 26 is the method of Example 23, wherein the plurality of rules comprises a data priority rule that prioritizes PSFCH transmissions of the pending PSFCH transmissions for inclusion in the subset according to a priority of data to which the PSFCH transmissions correspond.

Example 27 is the method of Example 26, wherein the plurality of rules comprises the data priority rule and a second rule, and wherein determining the subset of the plurality of pending PSFCH transmissions to transmit using one or more priority rules comprises applying the data priority rule prior to applying the second rule.

Example 28 is the method of Example 23, wherein the plurality of rules comprises a Hybrid Automatic Repeat Request (HARQ) acknowledgement (HARQ-ACK) rule that prioritizes PSFCH transmissions of the pending PSFCH transmissions for inclusion in the subset that contain HARQ-ACK messages.

Example 29 is the method of Example 28, wherein the plurality of rules comprises the HARQ-ACK rule and a second rule, and wherein determining the subset of the plurality of pending PSFCH transmissions to transmit using one or more priority rules comprises applying the HARQ-ACK rule prior to applying the second rule.

30. A method of a user equipment (UE) for prioritizing between using a time resource for physical sidelink (SL) feedback channel (PSFCH) transmission by the UE and PSFCH reception at the UE, comprising: determining that the PSFCH transmission and the PSFCH reception are scheduled to occur during the time resource; determining to perform one of the PSFCH transmission and the PSFCH reception during the time resource according to a plurality of rules; and performing the one of the PSFCH transmission and the PSFCH reception during the time resource according to the determination.

Example 31 is the method of Example 30, wherein the plurality of rules comprises a distance rule that selects one of the PSFCH transmission and the PSFCH reception for performance when a PSFCH message of the one of the PSFCH transmission and the PSFCH reception are between the UE and a peer UE which is a long distance from the UE and all PSFCH messages of the other of the PSFCH transmission and the PSFCH reception are between the UE and a peer UE which is not a long distance from the UE.

Example 32 is the method of Example 31, wherein the plurality of rules comprises the distance rule and a second rule; and wherein the second rule is used to select one of the PSFCH transmission and the PSFCH reception for performance when: PFSCH messages of the PSFCH transmission and PFSCH messages of the PSFCH reception are all between the UE and a peer UE that is not a long distance from the UE; or each of 1) the PFSCH messages of the PSFCH transmission and 2) the PFSCH messages of the PSFCH reception comprises at least one PFSCH message that is between the UE and a peer UE that is a long distance from the UE.

Example 33 is the method of Example 30, wherein the plurality of rules comprises a data priority rule that selects one of the PSFCH transmission and the PSFCH reception for performance when data corresponding to a PSFCH message of the one of the PSFCH transmission and the PSFCH reception has a higher priority than data corresponding to each of the PSFCH messages of the other of the PSFCH transmission and the PSFCH reception.

Example 34 is the method of Example 33, wherein the plurality of rules comprises the data priority rule and a second rule; and wherein the second rule is used to select one of the PSFCH transmission and the PSFCH reception for performance when a PFSCH message of the PSFCH transmission and a PFSCH message of the PSFCH reception share a priority that is the highest priority among all the PFSCH messages of the PSFCH transmission and the PSFCH messages of the PSFCH reception.

Example 35 may include an apparatus comprising means to perform one or more elements of a method described in or related to any of the above Examples, or any other method or process described herein.

Example 36 may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 37 may include an apparatus comprising logic, modules, or circuitry to perform one or more elements of a method described in or related to any of the above Examples, or any other method or process described herein.

Example 38 may include a method, technique, or process as described in or related to any of the above Examples, or portions or parts thereof.

Example 39 may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 40 may include a signal as described in or related to any of the above Examples, or portions or parts thereof.

Example 41 may include a datagram, packet, frame, segment, protocol data unit (PDU), or message as described in or related to any of the above Examples, or portions or parts thereof, or otherwise described in the present disclosure.

Example 42 may include a signal encoded with data as described in or related to any of the above Examples, or portions or parts thereof, or otherwise described in the present disclosure.

Example 43 may include a signal encoded with a datagram, packet, frame, segment, PDU, or message as described in or related to any of the above Examples, or portions or parts thereof, or otherwise described in the present disclosure.

Example 44 may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 45 may include a computer program comprising instructions, wherein execution of the program by a processing element is to cause the processing element to carry out the method, techniques, or process as described in or related to any of the above Examples, or portions thereof.

Example 46 may include a signal in a wireless network as shown and described herein.

Example 47 may include a method of communicating in a wireless network as shown and described herein.

Example 48 may include a system for providing wireless communication as shown and described herein.

Example 49 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for a user equipment (UE), to prioritize between using a time resource for physical sidelink (SL) feedback channel (PSFCH) transmission by the UE and PSFCH reception at the UE, the method comprising:
   determining that the PSFCH transmission and the PSFCH reception are scheduled to occur during the time resource;

determining to perform one of the PSFCH transmission and the PSFCH reception during the time resource according to a plurality of rules, wherein the plurality of rules comprises:
- a distance rule that selects one of the PSFCH transmission and the PSFCH reception for performance when a PSFCH message of the one of the PSFCH transmission and the PSFCH reception are between the UE and a peer UE which is a long distance from the UE and all PSFCH messages of the other of the PSFCH transmission and the PSFCH reception are between the UE and a peer UE which is not a long distance from the UE; and
- a second rule that is used to select one of the PSFCH transmission and the PSFCH reception for performance when PFSCH messages of the PSFCH transmission and PFSCH messages of the PSFCH reception are all between the UE and the peer UE that is not a long distance from the UE; and performing the one of the PSFCH transmission and the PSFCH reception during the time resource according to the determination.

2. The method of claim 1, wherein the second rule comprises a data priority rule that selects one of the PSFCH transmission and the PSFCH reception for performance when data corresponding to any PSFCH message of the one of the PSFCH transmission and the PSFCH reception has a higher priority than data corresponding to each of the PSFCH messages of the other of the PSFCH transmission and the PSFCH reception.

3. An apparatus of a user equipment (UE) operable to prioritize between using a time resource for physical sidelink (SL) feedback channel (PSFCH) transmission by the UE and PSFCH reception at the UE, the apparatus comprising:
- one or more processors; and
- a memory storing instructions that, when executed by the one or more processors, cause the UE to:
  - determine that the PSFCH transmission and the PSFCH reception are scheduled to occur during the time resource;
  - determine to perform one of the PSFCH transmission and the PSFCH reception during the time resource according to a plurality of rules, wherein the plurality of rules comprises:
    - a distance rule that selects one of the PSFCH transmission and the PSFCH reception for performance when a PSFCH message of the one of the PSFCH transmission and the PSFCH reception are between the UE and a peer UE which is a long distance from the UE and all PSFCH messages of the other of the PSFCH transmission and the PSFCH reception are between the UE and a peer UE which is not a long distance from the UE; and
    - a second rule that is used to select one of the PSFCH transmission and the PSFCH reception for performance when PFSCH messages of the PSFCH transmission and PFSCH messages of the PSFCH reception are all between the UE and the peer UE that is not a long distance from the UE; and
  - perform the one of the PSFCH transmission and the PSFCH reception during the time resource according to the determination.

4. The apparatus of claim 3, wherein the second rule comprises a data priority rule that selects one of the PSFCH transmission and the PSFCH reception for performance when data corresponding to any PSFCH message of the one of the PSFCH transmission and the PSFCH reception has a higher priority than data corresponding to each of the PSFCH messages of the other of the PSFCH transmission and the PSFCH reception.

5. A non-transitory computer-readable storage medium including instructions that, when executed by one or more processors of a user equipment (UE) operable to prioritize between using a time resource for physical sidelink (SL) feedback channel (PSFCH) transmission by the UE and PSFCH reception at the UE, cause the UE to:
- determine that the PSFCH transmission and the PSFCH reception are scheduled to occur during the time resource;
- determine to perform one of the PSFCH transmission and the PSFCH reception during the time resource according to a plurality of rules, wherein the plurality of rules comprises:
  - a distance rule that selects one of the PSFCH transmission and the PSFCH reception for performance when a PSFCH message of the one of the PSFCH transmission and the PSFCH reception are between the UE and a peer UE which is a long distance from the UE and all PSFCH messages of the other of the PSFCH transmission and the PSFCH reception are between the UE and a peer UE which is not a long distance from the UE; and
  - a second rule that is used to select one of the PSFCH transmission and the PSFCH reception for performance when PFSCH messages of the PSFCH transmission and PFSCH messages of the PSFCH reception are all between the UE and the peer UE that is not a long distance from the UE; and
- perform the one of the PSFCH transmission and the PSFCH reception during the time resource according to the determination.

6. The non-transitory computer-readable storage medium of claim 5, wherein the second rule comprises a data priority rule that selects one of the PSFCH transmission and the PSFCH reception for performance when data corresponding to any PSFCH message of the one of the PSFCH transmission and the PSFCH reception has a higher priority than data corresponding to each of the PSFCH messages of the other of the PSFCH transmission and the PSFCH reception.

* * * * *